United States Patent
Michelstein et al.

(10) Patent No.: US 8,979,538 B2
(45) Date of Patent: Mar. 17, 2015

(54) USING GAME PLAY ELEMENTS TO MOTIVATE LEARNING

(75) Inventors: Jennifer P. Michelstein, Kirkland, WA (US); Jonas Helin, Kirkland, WA (US); Mark R. Alexieff, Clyde Hill, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 557 days.

(21) Appl. No.: 12/790,472

(22) Filed: May 28, 2010

(65) Prior Publication Data

US 2010/0331064 A1    Dec. 30, 2010

Related U.S. Application Data

(63) Continuation-in-part of application No. 12/492,588, filed on Jun. 26, 2009.

(51) Int. Cl.
```
G09B 19/00     (2006.01)
G06F 3/00      (2006.01)
G06F 3/048     (2013.01)
G06Q 10/00     (2012.01)
A63F 13/30     (2014.01)
G06Q 10/10     (2012.01)
G06Q 50/20     (2012.01)
```

(52) U.S. Cl.
CPC ............... *A63F 13/12* (2013.01); *G06Q 10/10* (2013.01); *G06Q 50/20* (2013.01); *A63F 2300/558* (2013.01)
USPC ........... 434/118; 715/705; 715/706; 715/707; 715/708; 715/709; 705/7.27; 705/7.42

(58) Field of Classification Search
USPC .......... 434/118; 715/705–709; 705/7.27, 7.42
See application file for complete search history.

(56) References Cited

U.S. PATENT DOCUMENTS

| | | | |
|---|---|---|---|
| 6,025,841 A | 2/2000 | Finkelstein et al. | |
| 6,241,524 B1 * | 6/2001 | Aoshima et al. | 434/118 |
| 6,340,977 B1 * | 1/2002 | Lui et al. | 715/709 |

(Continued)

FOREIGN PATENT DOCUMENTS

| | | |
|---|---|---|
| CN | 1941750 A | 4/2007 |
| CN | 101079841 A | 11/2007 |

(Continued)

OTHER PUBLICATIONS

Zheng, "Search Commands . . . ", Apr. 28, 2008.*

(Continued)

*Primary Examiner* — Xuan Thai
*Assistant Examiner* — Michael Grant
(74) *Attorney, Agent, or Firm* — Jessica Meyers; Jim Ross; Micky Minhas

(57) ABSTRACT

Elements of game play, such as usage statistics, scores, levels, challenges, achievements, competition, and the like, are incorporated into a productivity application to assist in motivating users to learn features of the productivity application. A recommendation system is utilized to assist users in determining what features of the application to learn next. Help content that is associated with the productivity application can also be tied to the features that are currently being learned and used by the user such that the linked help content is readily available. Users may compare their scores and compete with other persons that are also participating in the game play learning system.

20 Claims, 15 Drawing Sheets

(56) References Cited

U.S. PATENT DOCUMENTS

| | | | |
|---|---|---|---|
| 6,714,929 B1 | 3/2004 | Micaelian et al. | |
| 6,782,414 B1 | 8/2004 | Xue et al. | |
| 7,035,926 B1 | 4/2006 | Cohen et al. | |
| 7,225,175 B2 | 5/2007 | Higgins et al. | 706/45 |
| 7,266,376 B2 | 9/2007 | Nakagawa | |
| 7,346,606 B2 | 3/2008 | Bharat | |
| 7,472,119 B2 | 12/2008 | Dai | |
| 7,493,521 B1 | 2/2009 | Li et al. | 714/38 |
| 7,716,240 B2 | 5/2010 | Lim | |
| 7,725,530 B2 | 5/2010 | Sah et al. | |
| 7,757,170 B2 | 7/2010 | Billsus et al. | |
| 7,962,466 B2 | 6/2011 | Jones et al. | |
| 8,010,527 B2 | 8/2011 | Denoue et al. | |
| 8,160,983 B2 | 4/2012 | Fitzmourice et al. | |
| 8,229,873 B1 | 7/2012 | Dolan et al. | |
| 8,301,482 B2 | 10/2012 | Reynolds et al. | |
| 8,468,201 B2 | 6/2013 | Dasilva et al. | |
| 8,819,009 B2 | 8/2014 | Wana et al. | |
| 2001/0021914 A1 | 9/2001 | Jacobi et al. | |
| 2002/0015056 A1* | 2/2002 | Weinlaender | 345/705 |
| 2002/0099812 A1 | 7/2002 | Davis et al. | |
| 2003/0014331 A1 | 1/2003 | Simons | |
| 2003/0014399 A1 | 1/2003 | Hansen et al. | |
| 2003/0014654 A1 | 1/2003 | Adler et al. | |
| 2003/0197738 A1 | 10/2003 | Beit-Zuri | 345/786 |
| 2003/0229808 A1 | 12/2003 | Heintz et al. | |
| 2004/0015868 A1* | 1/2004 | Dutta et al. | 717/126 |
| 2004/0030741 A1 | 2/2004 | Wolton et al. | |
| 2004/0210532 A1 | 10/2004 | Nagawa et al. | |
| 2004/0230530 A1 | 11/2004 | Searl et al. | |
| 2005/0097465 A1 | 5/2005 | Giesen et al. | |
| 2005/0203807 A1 | 9/2005 | Bezos et al. | |
| 2005/0222987 A1 | 10/2005 | Vadon | |
| 2006/0004698 A1 | 1/2006 | Pyhalammi | |
| 2006/0004914 A1 | 1/2006 | Kelly et al. | |
| 2006/0015821 A1 | 1/2006 | Parker et al. | |
| 2006/0036950 A1 | 2/2006 | Himberger | |
| 2006/0036964 A1 | 2/2006 | Satterfield | |
| 2006/0036965 A1 | 2/2006 | Harris | |
| 2006/0041562 A1 | 2/2006 | Paczkowski et al. | |
| 2006/0064411 A1 | 3/2006 | Gross et al. | |
| 2006/0127871 A1 | 6/2006 | Grayson | 434/350 |
| 2006/0200432 A1 | 9/2006 | Flinn et al. | |
| 2006/0247940 A1 | 11/2006 | Zhu et al. | |
| 2006/0277468 A1* | 12/2006 | Sapir | 715/708 |
| 2006/0294086 A1 | 12/2006 | Rose et al. | |
| 2007/0112768 A1 | 5/2007 | Majunder | |
| 2007/0168909 A1* | 7/2007 | Vaidyanathan et al. | 717/100 |
| 2007/0233671 A1 | 10/2007 | Oztekin et al. | |
| 2007/0239680 A1 | 10/2007 | Oztekin et al. | |
| 2007/0245020 A1 | 10/2007 | Ott | |
| 2007/0299631 A1 | 12/2007 | Macbeth | |
| 2008/0040474 A1 | 2/2008 | Zuckerberg et al. | |
| 2008/0040673 A1 | 2/2008 | Zuckerberg et al. | |
| 2008/0059516 A1 | 3/2008 | Cui | |
| 2008/0109722 A1* | 5/2008 | Gengler et al. | 715/708 |
| 2008/0109723 A1* | 5/2008 | Burton et al. | 715/708 |
| 2008/0147424 A1 | 6/2008 | Rowan et al. | |
| 2008/0177623 A1* | 7/2008 | Fritsch et al. | 705/11 |
| 2008/0189253 A1 | 8/2008 | Oliver et al. | |
| 2008/0209320 A1 | 8/2008 | Mawhinney et al. | |
| 2008/0256050 A1 | 10/2008 | Zhang | |
| 2008/0261191 A1* | 10/2008 | Woolf et al. | 434/323 |
| 2008/0270398 A1 | 10/2008 | Landau et al. | |
| 2008/0276179 A1 | 11/2008 | Borenstein | |
| 2008/0280662 A1 | 11/2008 | Matwin et al. | 463/9 |
| 2009/0006371 A1 | 1/2009 | Denoue et al. | |
| 2009/0019039 A1 | 1/2009 | Brindley | |
| 2009/0024712 A1 | 1/2009 | Weiss et al. | 709/207 |
| 2009/0035733 A1* | 2/2009 | Meitar et al. | 434/118 |
| 2009/0049141 A1 | 2/2009 | Jones et al. | |
| 2009/0070412 A1 | 3/2009 | D'Angelo et al. | |
| 2009/0087820 A1 | 4/2009 | Chandless | 434/129 |
| 2009/0089380 A1 | 4/2009 | Wang et al. | |
| 2009/0125597 A1 | 5/2009 | Carr et al. | |
| 2009/0150362 A1 | 6/2009 | Evenhaim | |
| 2009/0150507 A1 | 6/2009 | Davis | |
| 2009/0177754 A1 | 7/2009 | Brezina et al. | |
| 2009/0187631 A1 | 7/2009 | Su et al. | |
| 2009/0198562 A1 | 8/2009 | Wiesinger et al. | |
| 2009/0216741 A1 | 8/2009 | Thrall | |
| 2009/0221371 A1* | 9/2009 | Bakshi et al. | 463/36 |
| 2009/0248661 A1 | 10/2009 | Bilenko | |
| 2009/0299824 A1 | 12/2009 | Barnes, Jr. | |
| 2009/0299963 A1 | 12/2009 | Pippuri | |
| 2009/0300716 A1 | 12/2009 | Ahn | |
| 2009/0312033 A1 | 12/2009 | Shen et al. | |
| 2009/0319350 A1 | 12/2009 | Cansler | |
| 2010/0010968 A1 | 1/2010 | Redlich et al. | |
| 2010/0017870 A1 | 1/2010 | Kargupta | |
| 2010/0031162 A1* | 2/2010 | Wiser et al. | 715/747 |
| 2010/0049852 A1 | 2/2010 | Whitnah et al. | |
| 2010/0058185 A1 | 3/2010 | Commarford | |
| 2010/0125541 A1 | 5/2010 | Wendel et al. | |
| 2010/0125604 A1 | 5/2010 | Martinez et al. | |
| 2010/0131452 A1 | 5/2010 | Fitzmaurice et al. | |
| 2010/0137049 A1 | 6/2010 | Epstein | |
| 2010/0174712 A1 | 7/2010 | Li et al. | |
| 2010/0177938 A1 | 7/2010 | Martinez et al. | |
| 2010/0184495 A1* | 7/2010 | Levy et al. | 463/4 |
| 2010/0221694 A1* | 9/2010 | Moshenberg | 434/362 |
| 2010/0257489 A1 | 10/2010 | Sakanaba | |
| 2010/0263045 A1 | 10/2010 | Dulitz | |
| 2010/0269158 A1 | 10/2010 | Ehler et al. | |
| 2010/0287213 A1 | 11/2010 | Rolls | |
| 2010/0293190 A1 | 11/2010 | Kaiser et al. | |
| 2010/0331064 A1* | 12/2010 | Michelstein et al. | 463/1 |
| 2010/0331075 A1* | 12/2010 | Michelstein et al. | 463/23 |
| 2011/0093460 A1 | 4/2011 | Lunt et al. | |
| 2011/0131491 A1* | 6/2011 | Lu et al. | 715/708 |
| 2011/0179025 A1 | 7/2011 | Chuang | |
| 2011/0270850 A1 | 11/2011 | Wana et al. | |
| 2011/0276925 A1 | 11/2011 | Tumanov et al. | |
| 2011/0294564 A1* | 12/2011 | Michelstein et al. | 463/23 |
| 2011/0294565 A1* | 12/2011 | Michelstein et al. | 463/23 |
| 2012/0041972 A1 | 2/2012 | Goldberg | |
| 2012/0117470 A1* | 5/2012 | Michelstein et al. | 715/709 |
| 2012/0233161 A1 | 9/2012 | Xu et al. | |
| 2012/0233544 A1 | 9/2012 | Roy | |
| 2012/0271831 A1 | 10/2012 | Narayanan et al. | |
| 2012/0290545 A1 | 11/2012 | Tumanov | |
| 2012/0290565 A1 | 11/2012 | Wana | |
| 2013/0282706 A1 | 10/2013 | Yoo | |

FOREIGN PATENT DOCUMENTS

| | | | |
|---|---|---|---|
| CN | 10109514 A | 12/2007 | |
| KR | 10-2007-0096198 | 10/2007 | |
| WO | 2008/032950 | 3/2008 | |
| WO | 2008/060032 | 5/2008 | |
| WO | 2008/133368 | 11/2008 | |
| WO | WO 2009063469 A2 * | 5/2009 | G09B 7/04 |
| WO | 2010/048172 | 4/2010 | |

OTHER PUBLICATIONS

Basu, Saikat; Ribbon Hero, published Feb. 17, 2010, 11 pages.
Divelements; SandRibbon Version History, published Aug. 5, 2009, 4 pages.
Foss Software; Elegant Ribbon—Summary, Foss Software, © 1996, 2010, 5 pages.
IBM; Defining Help Panel Text, IBM®, © 1990, 2008, 6 pages.
Microsoft Office Labs Ribbon Hero, © 2010, 3 pages.
Pushing Pixels, published Apr. 10, 2010, 5 pages.
WPF Scrolling Content with Flicks and Gestures, accessed at: http://www.threobotgeek.net/articles/WPF_Scrolling_Content.aspx, accessed on Oct. 13, 2010, 5 pages.
Mark Prensky; "*The Motivation of Gameplay or, the REAL 21st century learning revolution*"; 2002; 14 Pgs.
Gil Taran; "*Using Games in Software Engineering Education to Teach Risk Management*"; 20th Conference on Software Engineering Education & Trainin (CSEET '07); 2007; 8 Pgs.

(56) References Cited

OTHER PUBLICATIONS

Office Action mailed Aug. 1, 2012, in U.S. Appl. No. 12/943,668.
Office Action mailed Oct. 24, 2012, in U.S. Appl. No. 12/943,668.
Anthony Salcito, "Ribbon Hero: Game-Based Learning for Office", Jan. 22, 2010: http://blogs.msdn.com/b/microsoftuseducation/archive/2010/01/22/ribbon-hero-game-based-learning-for-office.aspx.
Jennifer P. Michelstein, "Play Ribbon Hero and Hone Your Microsoft Office Skills", Jan. 19, 2010: http://www.officelabs.com/lists/posts/post.aspx?ID=88.
"Ribbon Hero-Boost Your Microsoft Office Skills With This Fun Add-On", Feb. 17, 2010: http://www.makeuseof.com/tag/ribbon-hero-boost-microsoft-office-skills-fun-addon/.
Kevin Abo, "Microsoft Office Labs Ribbon Hero", Mar. 5, 2010: http://windowslive.com/connect/post/4E7AC6A8-109E-44C3-B969-196C41FF5EC7.
Office Action mailed Dec. 7, 2012, in U.S. Appl. No. 13/111,101, 28 pages.
Office Action mailed Dec. 7, 2012, in U.S. Appl. No. 13/111,192, 18 pages.
Office Action mailed Sep. 26, 2012, in U.S. Appl. No. 13/106,307, 12 pages.
Radu Rusu, et al., "Usage Event Logging in Windows SharePoint Services", Jul. 2004: http://msdn.microsoft.com/en-us/library/dd583134(office.11).aspx.
Nagaraju Pappu, "A Knowledge Framework for Enterprise Application Systems Management", Nov. 2007: http://msdn.microsoft.com/en-us/library/bb897546.aspx.
"Courion Access Assurance Suite 8.0 Revolutionizes IAM by Integrating Critical Aspects of Compliance and Risk Mitigation", Feb. 23, 2010: http://www.courion.com/company/press_release.html?id=594.
Michael Paskevicius, "Introduction to learning and knowledge analytics", Jan. 13, 2011: http://www.bluelightdistrict.org/wp/?p=4534.
Office Action mailed Aug. 28, 2012, in U.S. Appl. No. 13/106,113, 17 pages.
Office Action mailed Jan. 3, 2013, in U.S. Appl. No. 12/492,588, 24 pages.
WO 2009/063469 A2; May 22, 2009; Israel; Moshenberg, Kalia; IPC G09B 7102 (Jan. 2006).
Zheng, "Search Commands . . . ", Apr. 28, 2008, 10 pages.
Office Action mailed Feb. 13, 2013, in U.S. Appl. No. 13/106,307, 17 pages.
Office Action mailed Feb. 14, 2013, in U.S. Appl. No. 13/106,113, 21 pages.
Arend, "Colleagues, Social Distance & Relevance in People Search; Social Networking Tools"; May 1, 2008; http://blogs.msdn.com/b/markarend/archive/2008/05/01.colleagues-social-distance-relevance-in-people-search-social-networking-tools.aspx; 5 pgs.
Artzi et al., "Instance Based Social Network Representative"; University of Washington, 2010; http://www.annitlevy.com/papers/community.pdf; 8 pgs.
Office Action mailed Mar. 28, 2013, in U.S. Appl. No. 12/943,668, 31 pgs.
Office Action mailed Aug. 28, 2013, in U.S. Appl. No. 12/943,668, 32 pgs.
Amazon.com Recommendations: Item-to-item collaborative filtering, Linden, G. Smith, B. and York, J., Jan./Feb. 2003 Internet Computing, IEEE, vol. 7, Issue 1, pp. 76-80, http://ieeexplore.ieee.org/xpls/abs_all.jsp?arnumber=1167344&tag=1 (cited in Jan. 30, 2013 OA).
An Online News Recommender System for Social Networks, Manish Agrawal, Maryam Karimzadehgan, ChengXiang Zhai, 2009, pp. 1-4, http://www.researchgate.net/publication/228576256_An_online_news_recommender_system_for_social_networks (cited in Jan. 30, 2013 OA).
Bailey et al.; Link Augmentation: A Context-Based Approach to Support Adaptive Hypermedia, published 2001, 8 pages.

Courtenage et al.; Automatic Hyperlink Creation Using P2P and Publish/Subscribe, published Apr. 2005, 8 pages.
Goecks et al.; Automatically Labeling Web Pages Based on Normal User Actions, published 1999, 5 pages.
Gray, "Cascaad Taps Social Graph for Tailored News," Feb. 7, 2010: http://blog.louisgray.com/2010/02/cascaad-taps-social-graph-for-tailored.html.
Group-Based Recipe Recommendations: Analysis of Data Aggregation Strategeies, Shlomo Berkovsky and Jill Freyne, Sep. 2010, RecSys2010, pp. 112-118 http://dl.acm.org/citation.cfm?id=1864732 (cited in Jan. 30, 2013 OA).
GroupLens: An Open Architecture for Collaborative Filtering of Netnews, Paul Resnick et al., 2009, pp. 175-186 http://dl.acm.org/citation.cfm?id=192905 (cited in Jan. 30, 2013 OA).
GroupLens: Applying Collaborative Filtering to Usenet News, Joseph A. Konstan et al., Mar. 1997, Communications of the ACM, vol. 40, No. 3, http://dl.acm.org/citation.cfm?id=245126 (cited in Jan. 30, 2013 OA).
Lawler, "Is the Social Graph Good for Video Recommendations?," Dec. 15, 2010: http://gigaom.com/video/clicker-facebook/.
Li et al.; Combining Usage, Content, and Structure Data to Improve Web Site Recommendation, published 2004, 11 pages.
Li et al., "Personalized Feed Recommendation Service for Social Networks," Aug. 20-22, 2010: http://ieeexplore.ieee.org/stamp/stamp.jsp?arnumber=05590802.
Marsden, "f-commerce Unleashed: Microsoft, Pandora & Yelp Show the Open Graph Way," May 6, 2010: http://socialcommercetoday.com/f-commerce-unleashed-microsoft-pandora-yelp-show-the-open-graph-way/.
"My6Sense for iPhone Studies Your Reading Habits, Recommends New Articles Based From It," Jul. 31, 2009: http://www.phoneblog.com/app-reviews/my6sense-for-iphone-studies-your-reading-habits-recommends-new-articles-based-from-it/.
Wu Ze-jun et al., "Personalized Recommendation System for E-Commerce Based on Psychological Community," May 16-17, 2009: http://ieeexplore.ieee.org/stamp/stamp.jsp?tp=&arnumber=5173235.
Yoo et al.; Mining Social Networks for Personalized Email Prioritization; Jul. 1, 2009; 9 pages.
International Search Report and Written Opinion cited in International Application No. PCT/US2011/032805 mailed Nov. 28, 2011.
International Search Report and Written Opinion cited in International Application No. PCT/US2011/031999 mailed Dec. 19, 2011.
Office Action mailed May 8, 2012, in U.S. Appl. No. 12/771,290. 21 pgs.
Office Action mailed Oct. 12, 2012, in U.S. Appl. No. 12/771,290. 21 pgs.
Office Action mailed Jan. 30, 2013, in U.S. Appl. No. 13/106,149, 26 pgs.
Office Action mailed Jun. 17, 2013, in U.S. Appl. No. 12/773,319, 28 pgs.
Office Action mailed Jul. 9, 2013, in U.S. Appl. No. 13/106,149, 30 pgs.
Office Action mailed Oct. 24, 2013, in U.S. Appl. No. 12/773,319, 28 pgs.
Bilenko et al.; Mining the Search Trails of Surfing Crowds: Identifying Relevant Websites from User Activity; Apr. 21-25, 2008; 10 pages.
Office Action mailed May 22, 2013, in U.S. Appl. No. 12/492,588, 38 pages.
Office Action mailed Jun. 28, 2013, in U.S. Appl. No. 13/111,101, 29 pages.
Office Action mailed Jul. 2, 2013, in U.S. Appl. No. 13/111,192, 22 pages.
Office Action mailed Mar. 12, 2014, in U.S. Appl. No. 13/106,149, 33 pgs.
Office Action mailed Mar. 27, 2014, in U.S. Appl. No. 12/943,668, 41 pgs.
Office Action mailed Nov. 29, 2013, in U.S. Appl. No. 13/106,113, 30 pgs.
Office Action mailed Jan. 3, 2014, in U.S. Appl. No. 12/492,588, 48 pgs.

(56) References Cited

OTHER PUBLICATIONS

Office Action mailed Feb. 26, 2014, in Australian Application No. 2011248879, 3 pgs.
Notice of Allowance mailed Apr. 11, 2014 in U.S. Appl. No. 13/106,307, 26 pgs.
Office Action mailed Jul. 18, 2014, in U.S. Appl. No. 12/492,588, 42 pgs.
Office Action mailed Jul. 31, 2014, in U.S. Appl. No. 13/106,113, 29 pgs.
Office Action mailed Aug. 13, 2014, in U.S. Appl. No. 12/773,319, 30 pgs.
Australian Office Action dated May 1, 2014 in Appln No. 2011248879.
Office Action mailed Sep. 11, 2014, in U.S. Appl. No. 12/771,290, 39 pgs.
Office Action mailed Sep. 12, 2014, in U.S. Appl. No. 13/111,101, 70 pgs.
Office Action mailed Sep. 18, 2014, in U.S. Appl. No. 13/111,192, 49 pgs.
Office Action mailed Oct. 10, 2014, in U.S. Appl. No. 12/492,588, 44 pgs.
Office Action mailed Oct. 14, 2014, in U.S. Appl. No. 12/773,319, 25 pgs.
Chinese Office Action dated Oct. 30, 2014 in Appln No. 201180022229.X, 17 pgs.
Chinese Office Action dated Nov. 4, 2014 in Appln No. 201180021588.3, 13 pgs.
Office Action mailed Nov. 19, 2014, in U.S. Appl. No. 12/943,668, 53 pgs.
Office Action mailed Dec. 15, 2014, in U.S. Appl. No. 13/106,149, 52 pgs.
Notice of Acceptance dated Sep. 18, 2014 in Appln No. 2011248879, 2 pgs.

\* cited by examiner

USING GAME PLAY ELEMENTS TO MOTIVATE LEARNING

RELATED APPLICATIONS

The present application is a continuation-in-part of U.S. patent application Ser. No. 12/492,588, filed Jun. 26, 2009, which is incorporated by reference and claims the benefit of the earlier filing date under 35 U.S.C. §120.

BACKGROUND

Many individuals spend a lot of time trying to become proficient at software games. For example, in order to maximize their points and complete all of the objectives of a game, users attempt to learn in detail how each level and other aspects of the game works. Some individuals even play the game to the point where the game stops being fun and starts being a chore in order to become proficient.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Elements of game play, such as usage statistics, scores, levels, challenges, achievements, competition, and the like, are incorporated into a productivity application to assist in motivating users to learn features of the productivity application. A recommendation system is utilized to assist users in determining what features of the application to learn. Help content that is associated with the productivity application can also be tied to the features that are currently being learned and used by the user such that the linked help content is readily available. Users may compare their scores and compete with other persons that are also participating in the game play learning system.

DETAILED DESCRIPTION

Figure 1:
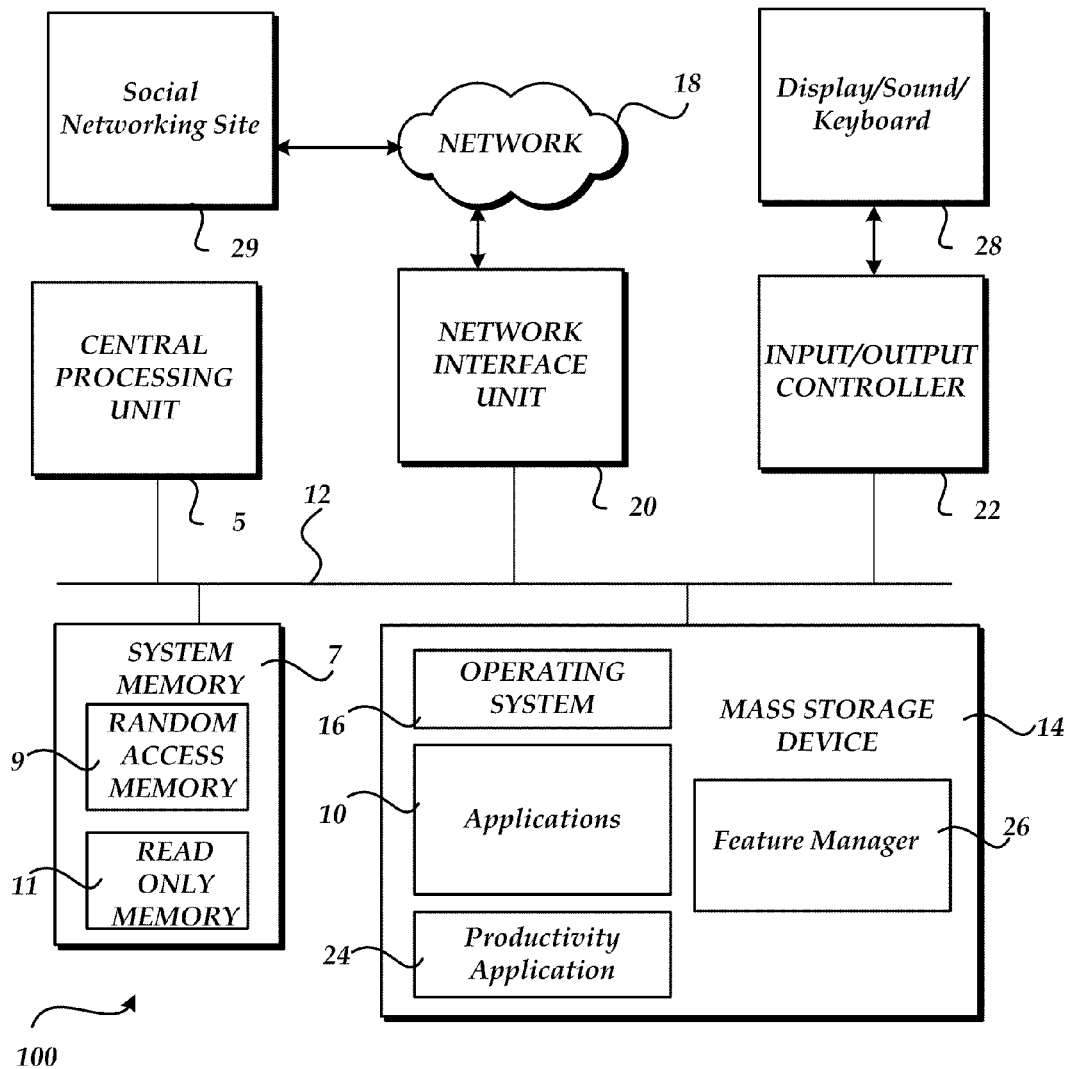
FIG. 1 illustrates a computer architecture for a computer.

Referring now to the drawings, in which like numerals represent like elements, various embodiments will be described. In particular, FIG. 1 and the corresponding discussion are intended to provide a brief, general description of a suitable computing environment in which embodiments may be implemented.

Generally, program modules include routines, programs, components, data structures, and other types of structures that perform particular tasks or implement particular abstract data types. Other computer system configurations may also be used, including multiprocessor systems, microprocessor-based or programmable consumer electronics, minicomputers, mainframe computers, and the like. Distributed computing environments may also be used where tasks are performed by remote processing devices that are linked through a communications network. In a distributed computing environment, program modules may be located in both local and remote memory storage devices.

Referring now to FIG. 1, an illustrative computer architecture for a computer 100 utilized in the various embodiments will be described. The computer architecture shown in FIG. 1 may be configured as a desktop, a server, or mobile computer and includes a central processing unit 5 ("CPU"), a system memory 7, including a random access memory 9 ("RAM") and a read-only memory ("ROM") 10, and a system bus 12 that couples the memory to the CPU 5. A basic input/output system containing the basic routines that help to transfer information between elements within the computer, such as during startup, is stored in the ROM 10. The computer 100 further includes a mass storage device 14 for storing an operating system 16, application programs, and other program modules, which will be described in greater detail below.

The mass storage device 14 is connected to the CPU 5 through a mass storage controller (not shown) connected to the bus 12. The mass storage device 14 and its associated computer-readable media provide non-volatile storage for the computer 100. Although the description of computer-readable media contained herein refers to a mass storage device, such as a hard disk or CD-ROM drive, the computer-readable media can be any available media that can be accessed by the computer 100.

The term computer readable media as used herein may include computer storage media. Computer storage media may include volatile and nonvolatile, removable and non-removable media implemented in any method or technology for storage of information, such as computer readable instructions, data structures, program modules, or other data. System memory 7, removable storage and non-removable storage are all computer storage media examples (i.e memory storage.) Computer storage media may include, but is not limited to, RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store information and which can be accessed by computing device 100. Any such computer storage media may be part of device 100. Computing device 100 may also have input device(s) 28 such as a keyboard, a mouse, a pen, a sound input device, a touch input device, etc. Output device(s) 28 such as a display, speakers, a printer, etc. may also be included. The aforementioned devices are examples and others may be used.

The term computer readable media as used herein may also include communication media. Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media According to various embodiments, computer 100 operates in a networked environment using logical connections to remote computers through a network 18, such as the Internet. The computer 100 may connect to the network 18 through a network interface unit 20 connected to the bus 12. The network connection may be wireless and/or wired. The network interface unit 20 may also be utilized to connect to other types of networks and remote computer systems. The computer 100 may also include an input/output controller 22 for receiving and processing input from a number of other devices, including a keyboard, mouse, or electronic stylus (not shown in FIG. 1). Similarly, an input/output controller 22 may provide output to a display screen that includes a user interface 28, a printer, or other type of output device. User interface (UI) 28 is designed to provide a user with a visual way to interact with application 24 that incorporates game play elements for learning features of the application, as well as to interact with other functionality that is included on computing device 100.

As mentioned briefly above, a number of program modules and data files may be stored in the mass storage device 14 and RAM 9 of the computer 100, including an operating system 16 suitable for controlling the operation of a networked computer, such as the WINDOWS 7® operating system from MICROSOFT CORPORATION of Redmond, Wash. The mass storage device 14 and RAM 9 may also store one or more program modules. In particular, the mass storage device 14 and the RAM 9 may store one or more application programs. One of the application programs is a productivity application 24, such as one of the MICROSOFT OFFICE® programs.

Generally, productivity application 24 is an application that a user utilizes in order to complete a task, such as authoring a document in a word-processing program, programming a feature, authoring a spreadsheet, and the like. Productivity application 24 is an application such as a word-processing program, a presentation program, a spreadsheet program, a database program, a programming environment, and the like. Feature manager 26 is configured to incorporate elements of game play into productivity application 24 to assist in motivating users to learn how to use features of the application. For example, the elements of game play that may be incorporated into the application may include items such as usage statistics, scores, levels, challenges, achievements, competition, and the like. Feature manager 26 is configured to track the usage of the features within the application by a user and provide the user with feedback relating to the usage of the features as well as to provide recommendations on what features to learn next. The recommendations may be based on what features the user has already learned and/or based on what features the user's peers are using. Feature manager 26 is also configured to link help content that is associated with the productivity application with the features that are currently being used by the user such that the help content for the feature that is currently being used is available to the user with a single selection. Feature Manager 26 is configured to incorporate the use of a social networking site 29 such that a user's peers may be obtained for competition and provide updates to the user and the user's peers as to accomplishments using the productivity application.

Figure 2:
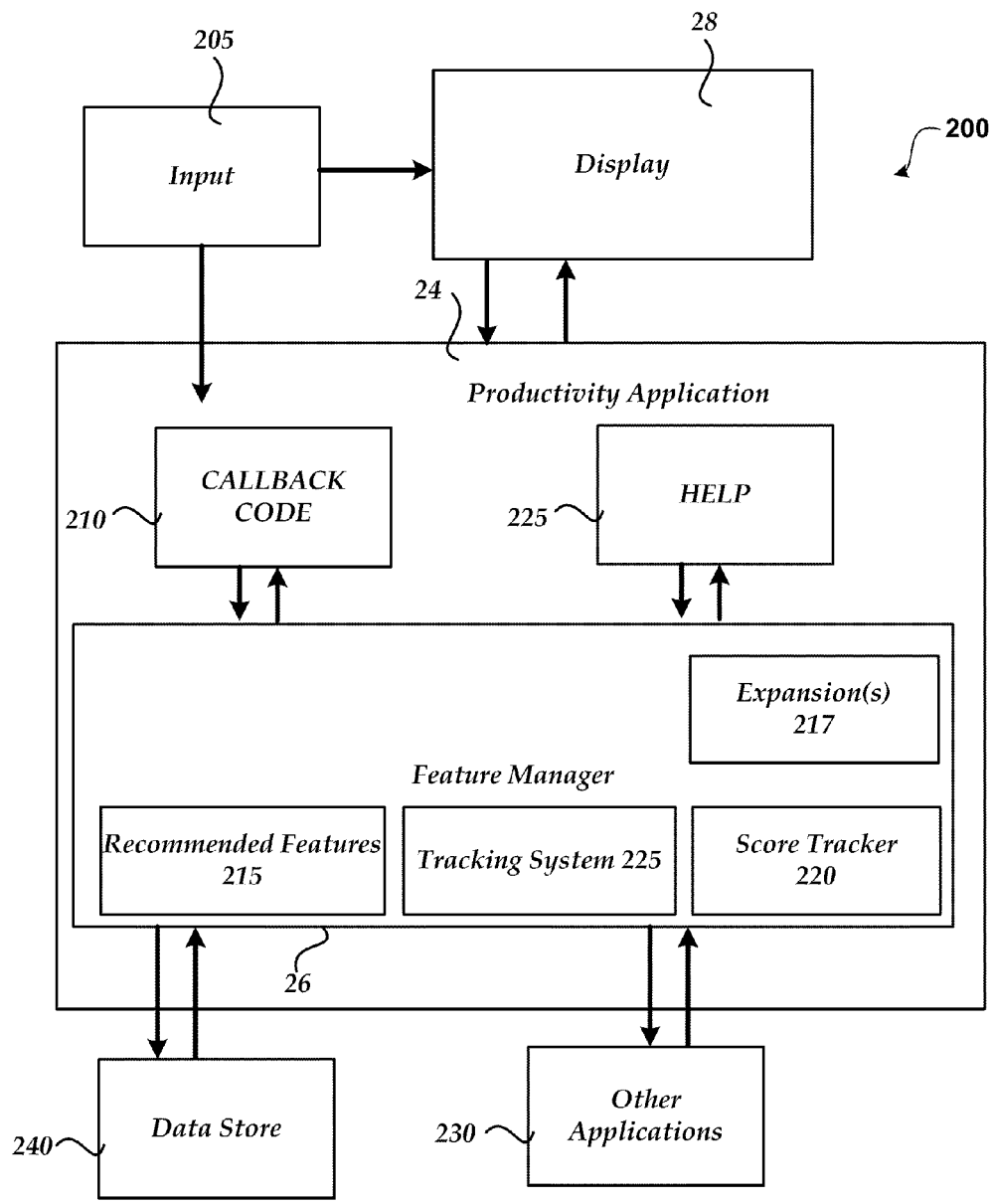
FIG. 2 shows an example learning system using game elements for motivating learning within a productivity application.

FIG. 2 shows an example learning system using game elements for motivating learning within a productivity application. While only one productivity application is illustrated, the game elements may be incorporated into any number of applications. As illustrated, system 200 includes display 28, input 205, and productivity application 24. Feature manager 26 may be implemented within presentation application 10 as shown in FIG. 2 or may be implemented externally from application 24 as shown in FIG. 1.

In order to facilitate communication with the feature manager 26, one or more callback routines, illustrated in FIG. 2 as callback code 210, may be implemented. Through the use of the callback code 210, the feature manager 26 may query for additional information used in incorporating the elements of game play within productivity application 24. For example, feature manager 26 may request to be informed when a user transitions to another feature within the application. Other information may also be provided that relate to the features of the application. As discussed above, feature manager 26 is configured to incorporate game play elements into productivity application 24.

Feature manager 26 utilizes a tracking system 225 that provides statistics and usage reporting based on what features the user is utilizing in the application. The features that are tracked may be any features included within the application. For example, the features may be a base set of features that broadly covers the functionality of the application or some other set of features within the application. Feature manager 26 may store this tracked information for the user as well as a group of other users. The group of the other users may be determined from a social networking site associated with the user and/or from other sources. For example, company organization charts, buddy lists, email lists, and the like may be used. The features used by the user and tracked by tracking system 225 are also used to determine a score for the user as determined by score tracker 220 as well as provide recommendations to the user as to what features to learn next.

Score tracker 220 is configured to map the usage information for a feature(s) into a quantifiable value that may be converted into points, badges, levels, scores, and the like. Feature manager 26 is also configured to provide different challenges to a user that allows them to accumulate additional points, badges, and the like while learning a new feature of application 24.

According to an embodiment, a leader board and other score displays are provided that allows the user to see how they are performing both individually as well as how they are performing relative to other users. For example, the group may be a work group, a set of designated friends, friends from one or more social networking sites, users who have a same work title, users in the same profession, and the like. In this way, a user may compare their scores and learning experience to other similarly situated users. Scores and accomplishments may be delivered to other users automatically and/or manually. For example, a user's friends on a social networking site may be notified when a user achieves a certain number of points and/or an accomplishment in one of the productivity applications. A user's wall on the social networking site may also be updated with messages indicating the user's progress in the productivity application.

Score tracker 220 is configured to determine when a user reaches a predetermined score such that the user is provided with a reward. For example, the reward may be unlocking videos, pictures, games, customization of the application, and the like. Score tracker 220 may also be configured to provide performance information relating to head-to-head competition between two or more users. For example a user could challenge one or more other users to play the same challenge. The results of these challenges may be delivered to other users through messages, such as text messages, email messages, messages to social networking sites, and the like. Feature manager 26 may also be configured to initiate head-to-head competitions. According to one embodiment, points are provided to the user in the head-to-head competition who completes the challenge fastest and/or most efficiently uses the features of the application to complete the challenge.

Recommended features 215 is configured to provide recommendations and challenges to the user for what to learn next, based on what the user has done or not done within the application, and based on the social element of what features within the productivity application other users are using and/or have already learned. The recommended features that are suggested may be based on features that enhance the features the user is currently using. For example, if the user uses three features out of a group of five related features, the other two features that are not used by the user may be suggested. Recommended features 215 may also present features that are not available in the user's version of the productivity application but are available in a newer version of the application. In this way, a user may learn about features that may be useful to them but may not be aware of since they are not using the most current version of the productivity application.

Feature manager 26 is coupled to help system 225 such that help content that is supplied by the productivity application is provided to the user based on what features/actions the user is or is not doing relating to the application. According to an embodiment, the help system 225 is the help content that is natively provided by productivity application 24. For example, when a user is learning feature one as determined by tracking system 225, the help content relating to feature one may be automatically linked to the feature such that the user may directly select help for the feature without having to search for the desired help content. Feature manager 26 tracks what the user is doing and then proactively surfaces help topics for that user.

Feature manager 26 is also configured to be expandable through one or more expansions 217. Expansions 217 may add functionality to feature manager 26 before or after the deployment of productivity application 24. For example, one or more "challenge" expansions that add new game/learning elements may be created by the developer of productivity application 24 and/or third party developers and then integrated and utilized by feature manager 26 to present the challenge. The expansions may be integrated with feature manager 26 using many different methods. For example, the expansion may be a patch to the productivity application, a plug-in, and the like.

Display 28 is configured to provide the user with a visual display of their score, as well as provide recommendations to the user and present the user with challenges (See FIGURES below for exemplary user interfaces).

Feature manager 26 is also coupled to other applications 230 such that information relating to the scores and recommendations may be provided to the other application as well as receiving information from the other applications. For example, feature manager 26 may be coupled to a social networking site such that when a user accesses the social networking site they are able to see how they are performing using application 24 as well as see how their linked associates are performing. Feature manager 26 may also post this performance and recommendation information to other locations, such as including the information within a news feed of a social networking site and/or some other location that is available by users. Another example application that may be linked is a messaging application such that the performance information/recommendations can be delivered to one or more users. Feature manager 26 may also be coupled to a backend data store 240 that is used to store the performance and recommendation information. Data store 240 may be a network data store and/or a local data store.

Different computers may be used by the same user when performing challenges and interacting with the productivity application. As a result, a user may accumulate points on one or more different computers. Data store 240 may be configured to provide feature manager 26 with the most current score information for a user such that points obtained across different computer systems by the user are combined to create a single score that incorporates all of the points of the different computing systems. This score information may be obtained in different ways. For example, the globally stored score information may be obtained when a user logs onto a system and/or connects to a social networking site. When the user logs onto the system, the most current score information is obtained and is used to update the globally stored score information with the locally stored information. Upon logging onto the system, the system may determine that the points on the local system do not match the globally stored information. According to one embodiment, a social network identifier is used to uniquely identify the user within the database and obtain the score information for that user. The points stored locally on the computer are compared to the globally obtained scores and a union of the points from the challenges is used to update the scores for the user.

Figure 3:
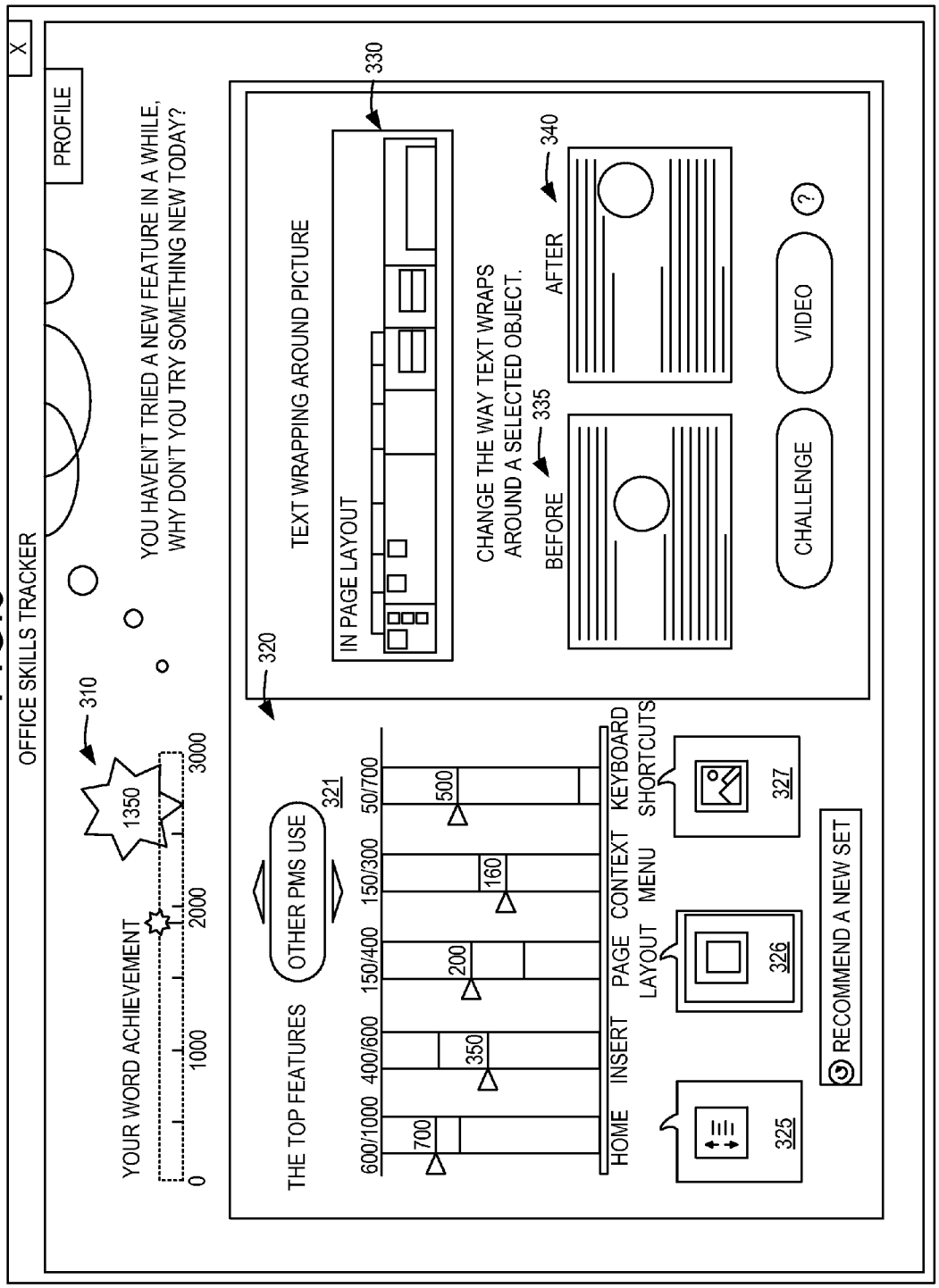
FIGS. 3 and 4 show exemplary user interfaces for viewing performance information and presenting challenges.

FIG. 3 shows an exemplary user interface for viewing performance information and presenting challenges. As illustrated, user interface 300 includes user score 310, graph area 320, recommendations 325-327, display 330, a before preview picture 335, an after preview picture 340, and challenge, video, and help buttons.

As illustrated, user score 310 shows a score of 1350 that is based on the features that a user has utilized within the application. In order to increase the score, a user can accumulate points by using more features or groups of features that are associated with the productivity application. In the present example, the productivity application is a word-processing application. Other applications may also be utilized. For example, the performance information may relate to another application within a suite of programs and/or the entire suite of applications. According to one embodiment, the more difficult the feature or set of features utilized, the higher the value that is associated with the score.

Graph area 320 displays how the points making up user score 310 are distributed. In this way, a user can see what parts of the application they are using and how proficient they are at using the features. Graph area 320 also provides score comparisons based on other groups of users. As discussed above, these other user groups may be determined from the user's profession, people who work for the same company, all users, people at the user's similar level in the productivity application, people who utilize the application similarly to the user, people in the user's zip code, age group, gender, social networking groups, and the like. A group from which to compare may be selected by utilizing button 321.

Exemplary user interface 300 provides recommendations (e.g. 325-327) based on the top features the selected group is using that the user is not currently using and/or based on the features used by the user. In the present example, three recommendations (325-327) have been provided to the user. In order to learn these unused features, a training challenge may be associated with each suggestion. In the present example, text wrapping 326 around a picture is recommended for a user. When the user selects one of the recommendations (i.e. clicking on text wrapping 326), the user is presented with a display 330 that shows where the feature exists in the productivity application, a before picture 335 and after picture 340 that illustrates the benefits of using the feature, and different types of training such as a short video demo, a challenge which is like a small game or puzzle where the user is challenged to use the feature inside the application, and a tie-in to existing help content.

Figure 4:
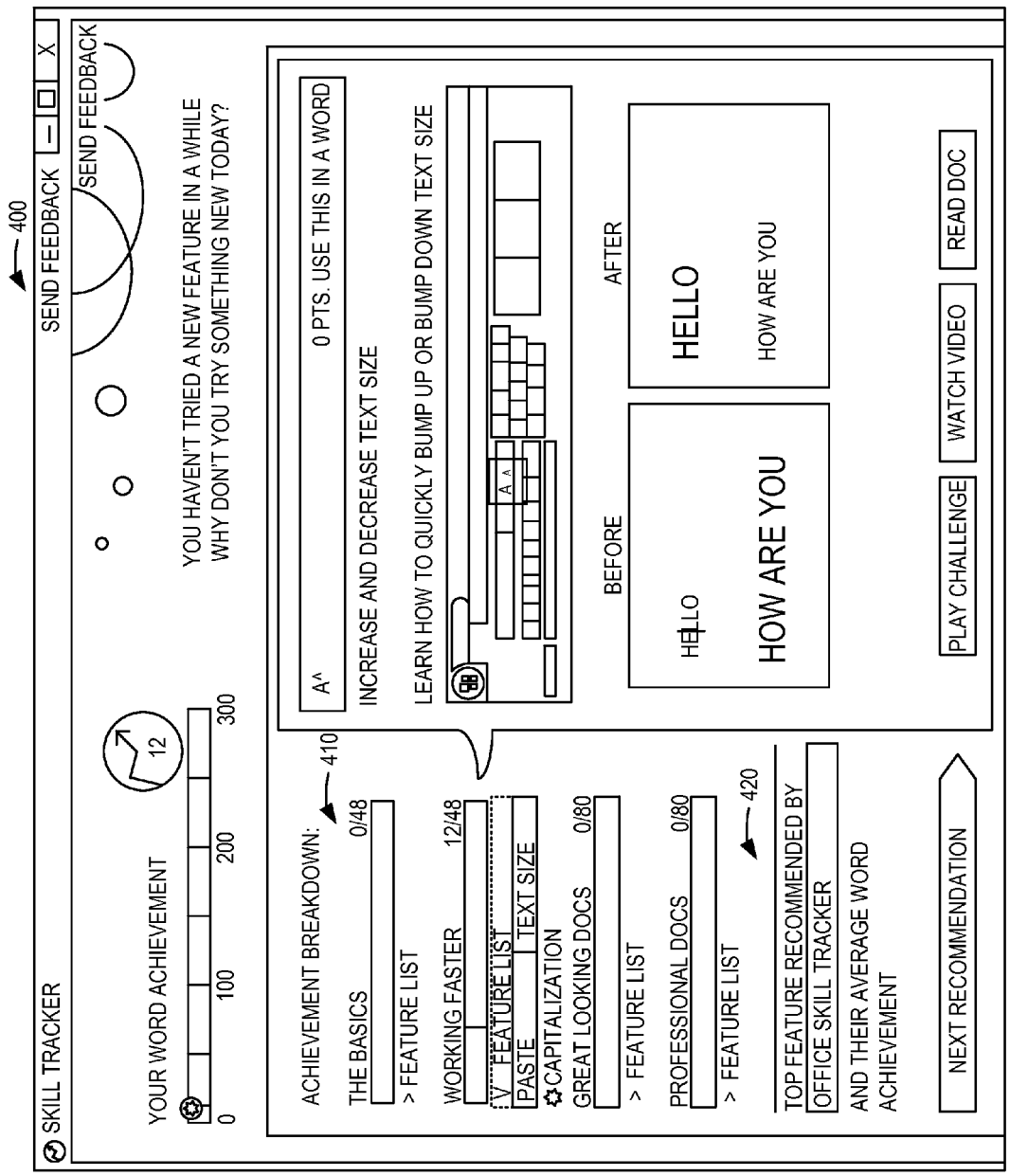

FIG. 4 shows another exemplary user interface for viewing performance information and presenting challenges. As illustrated, user interface 400 is similar to user interface 300. Achievement breakdown area 410 provides a user with a view of feature areas included within an application and how they are performing within these features areas. As illustrated, most of the score bars are empty (The Basics, Great Looking Docs, Professional Docs) indicating that the user has just begun using game play elements and has many different features to learn.

Selection area 420 allows a user to select a group from which the recommendations provided to the user are based as well as the groups' average achievement score. For example, when one group is selected a first set of recommendations is provided whereas when another group is selected, a second set of recommendations is provided. In this example, the recommendations are based on how the selected group uses the application and the user is not using the application. For instance, when the user compares himself to Group A and Group A uses feature X (that the user does not), a recommendation provided to the user is to learn feature X. If the user then compares himself to Group B and Group B does not use feature X, but instead uses feature Y, feature Y is recommended to the user.

Figure 5:
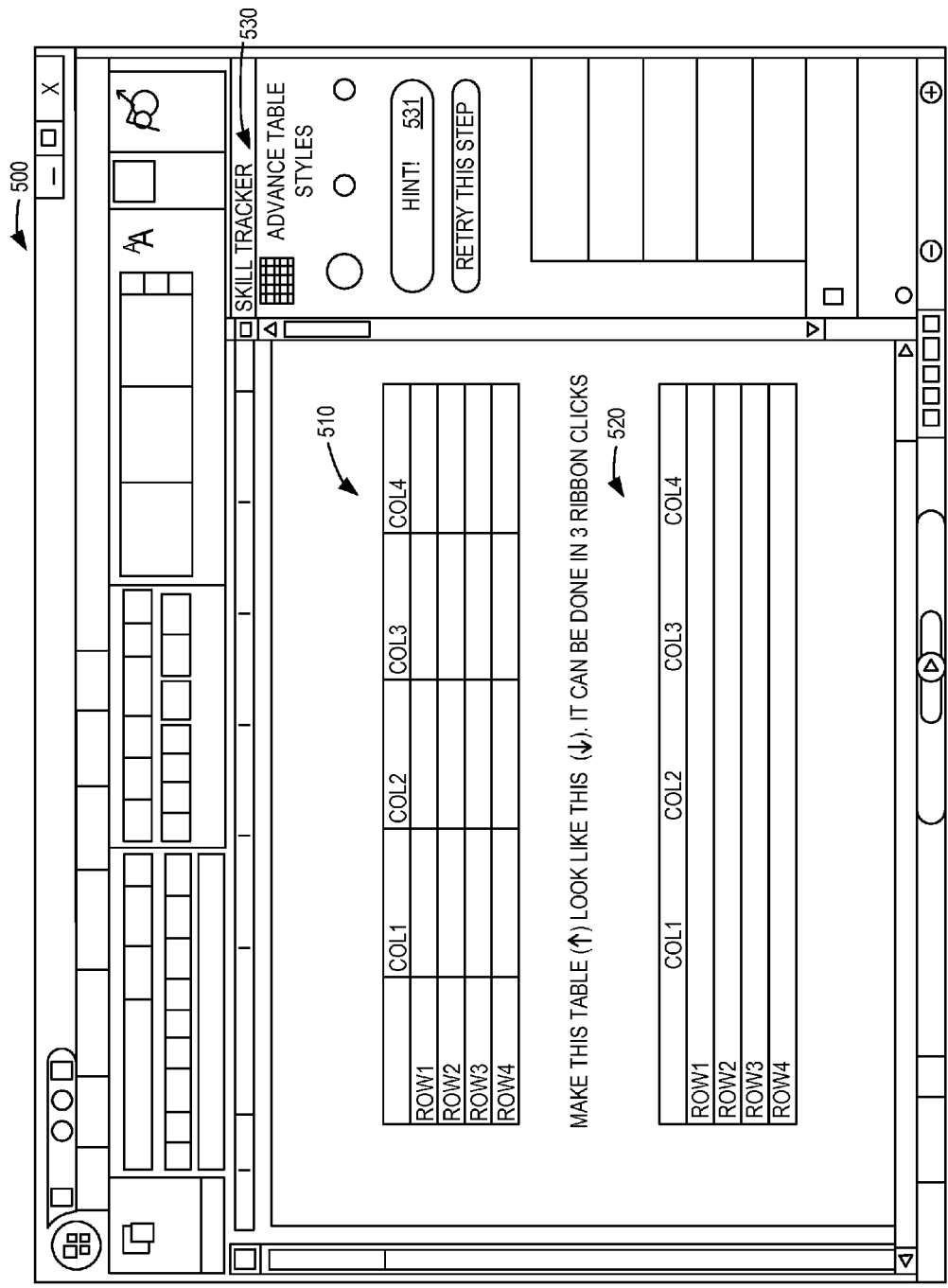
FIG. 5 illustrates an exemplary training challenge that is utilized in learning a feature.

FIG. 5 illustrates an exemplary training challenge 500 that is utilized in learning a feature. In response to a user selecting a challenge, a challenge is presented to a user that allows them to learn a feature. In the present example, the challenge is reformatting table 510 to make it appear as table 520. Many different challenges may be created for a feature. Area 530 provides the user with information on their progress within the challenge as well as allowing them to receive a hint using button 531 when they become stuck in the challenge. The user may practice in the challenge area until they are comfortable with the feature. Points are also awarded for completing a challenge. The points awarded may be determined using many different criteria. For example, the difficulty of the challenge, the time it took to complete the challenge, the navigation of the application functionality, and the like. Sound may be used to assist the user during the challenge. For example, a sound may be provided when the user performs an option correctly and a different sound when a user performs an incorrect operation (i.e. selects a wrong menu item). The sound may also be modified based on how quickly the user performs a challenge.

Figure 6:
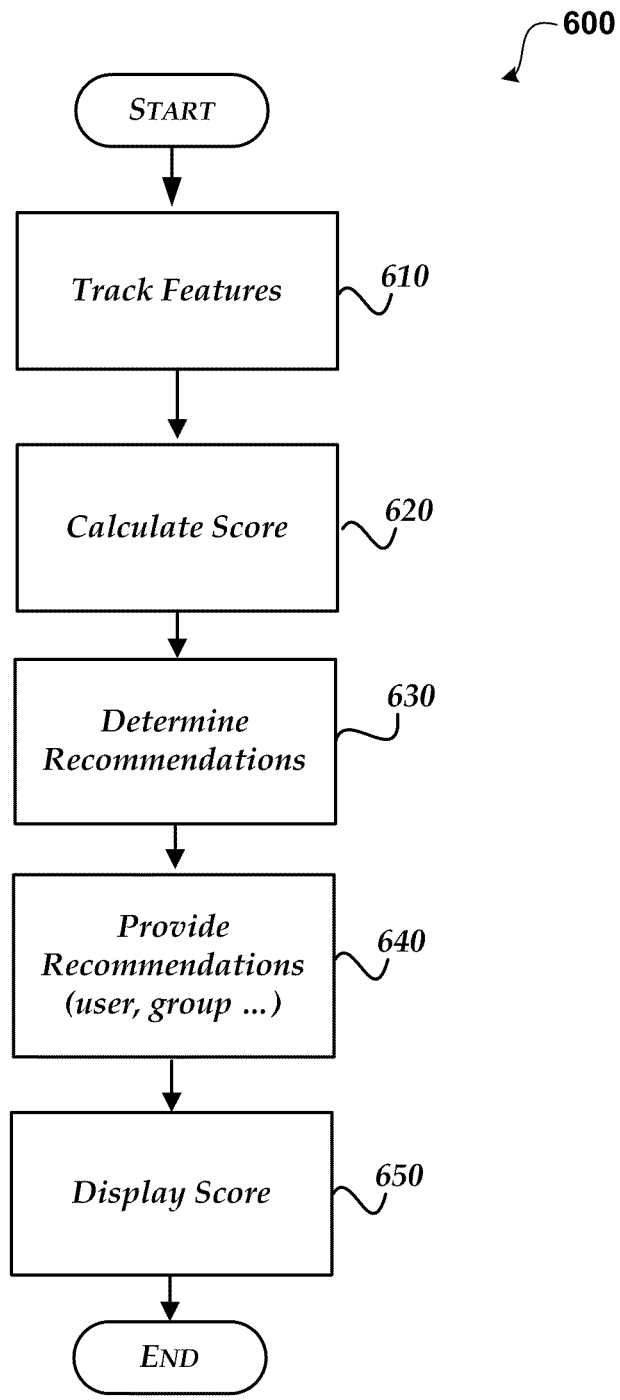
FIG. 6 illustrates a process for employing gaming elements within an application to motivate learning.
Figure 7:
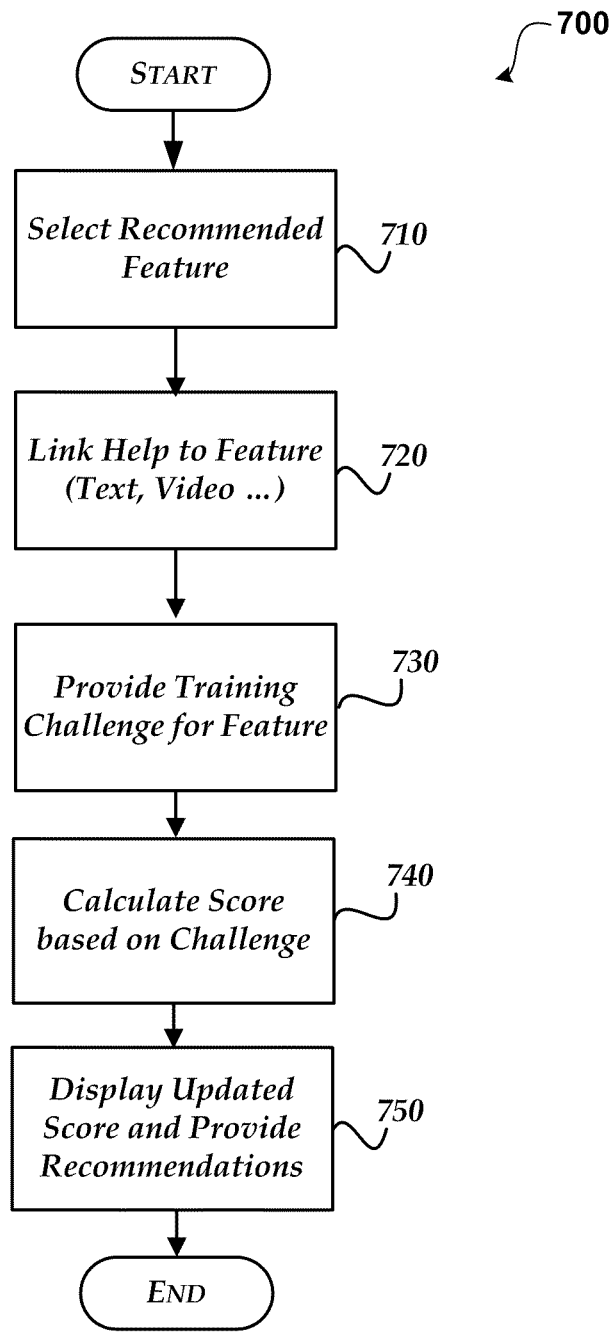
FIG. 7 shows a process for learning a new feature using game play elements.

Referring now to FIGS. 6-7, illustrative processes for employing game elements to motivate learning within a productivity application is described.

When reading the discussion of the routines presented herein, it should be appreciated that the logical operations of various embodiments are implemented (1) as a sequence of computer implemented acts or program modules running on a computing system and/or (2) as interconnected machine logic circuits or circuit modules within the computing system. The implementation is a matter of choice dependent on the performance requirements of the computing system implementing the invention. Accordingly, the logical operations illustrated and making up the embodiments described herein are referred to variously as operations, structural devices, acts or modules. These operations, structural devices, acts and modules may be implemented in software, in firmware, in special purpose digital logic, and any combination thereof.

FIG. 6 illustrates a process 600 for employing gaming elements within an application to motivate learning.

After a start operation, the process flows to operation 610, where the features within an application that are utilized by a user are tracked. The features tracked relate to features within one or more areas of the application. For example, the features may be divided according to functions performed within the application (i.e. formatting text, pictures, and the like).

Moving to operation 620, a score is calculated for each feature that is utilized. When a user utilizes a new feature, a score is attached to that action. The score may be dependent upon many factors, such as feature utilized, time the feature is utilized, difficulty level, and the like.

Flowing to operation 630, recommendations are determined for a user. The recommendations on what feature to learn next may be based on different items, including what the user has done or not done within the application and what features other users are using.

Transitioning to operation 640, the recommendations are provided to the user. The recommendations may be provided many different ways. For example, the recommendations may be provided within a user interface, the recommendations may be provided within a social networking site, and/or an electronic message may be sent to the user that includes the recommendations.

Moving to operation 650, the score is displayed to the user. As previously discussed, the score displayed may include an individual score, as well as scoring information as it relates to one or more groups of users.

The process then flows to an end operation and returns to processing other actions.

FIG. 7 shows a process 700 for learning a new feature using game play elements.

After a start operation, the process flows to operation 710, where a recommended feature is selected. According to one embodiment, the feature is selected from a group of recommended features that are selected for the user.

Moving to operation 720, the help content that relates to the selected feature within the application is linked to a training challenge for the feature. The linked help content is readily available for the user without the user having to search for a specific help topic.

Flowing to operation 730, a training challenge for the feature is provided to the user. The training challenge allows the user to use the application in order to practice the feature while at the same time presenting the challenge using game playing elements.

Moving to operation 740, a score is calculated based on the interaction with the features during the challenge.

Flowing to operation 750, the user score is updated and displayed to the user. The user may also be provided with a new recommendation on what feature to learn next.

The process then flows to an end operation and returns to processing other actions.

Figure 8:
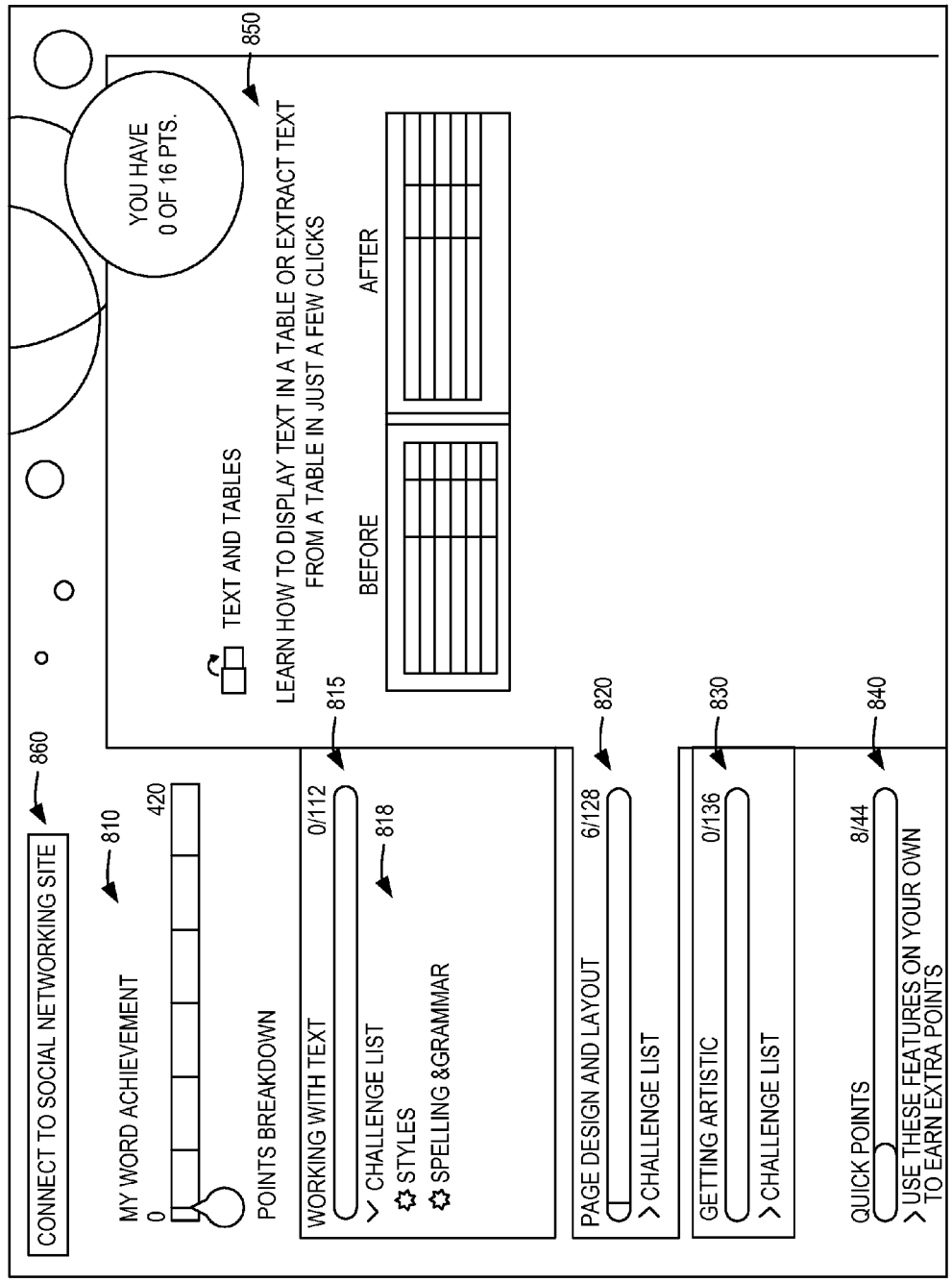
FIG. 8 shows an exemplary user interface for viewing performance information and presenting challenges.

FIG. 8 shows an exemplary user interface for viewing performance information and presenting challenges. As illustrated, user interface 800 includes an overall score 810 for a productivity application, individual scores for different areas of an application (815, 820, 830 and 840), challenge list 818, preview area 850 and an option to connect to a social networking site (860).

As illustrated, score 810 shows a score of 14 out of 420 total points for the application. In order to increase the score, a user can select challenges from challenge lists provided with each area of the application (815, 820, 830 and 840), and/or use features directly within the application. In the present example, the productivity application is a word-processing application. Other applications may also be utilized. For example, the performance information may relate to another application within a suite of programs and/or the entire suite of applications.

Each area of the application in which points may be awarded includes a score display for that area. For example, the "Working with Text" area 815 shows that a user may obtain a total of 112 points by successfully completed the displayed challenges 818. In this way, a user can quickly see what parts of the application they are using and how proficient they are at using the features.

Page design and Layout section 820 accounts for 128 points. Getting Artistic section 830 accounts for 136 points and Quick Points section 840 accounts for 44 points. According to one embodiment, a bar graph is filled in as a user accumulates more points for that section. Under each of the sections, a challenge list selection is provided. Selection of one of the challenge list links expands the selected section and reveals the available challenges to a user (see 818).

Display area 850 provides the user with a recommended challenge and/or a challenge that the user has manually selected. Next to each challenge an indication is provided to the user as to whether or not they have completed the challenge. According to one embodiment, a star next to the challenge is unfilled when the challenge has not been completed and filled when the challenge has been completed.

A user may decide to connect to a social networking site directly from interface 800 using button 860. When a user selects button 860, they will enter any needed information and be connected to a social networking site. Upon connecting to the social networking site, more information may be provided to the user and incorporated into the challenge and score display (See FIGS. 11-15).

Figure 9:
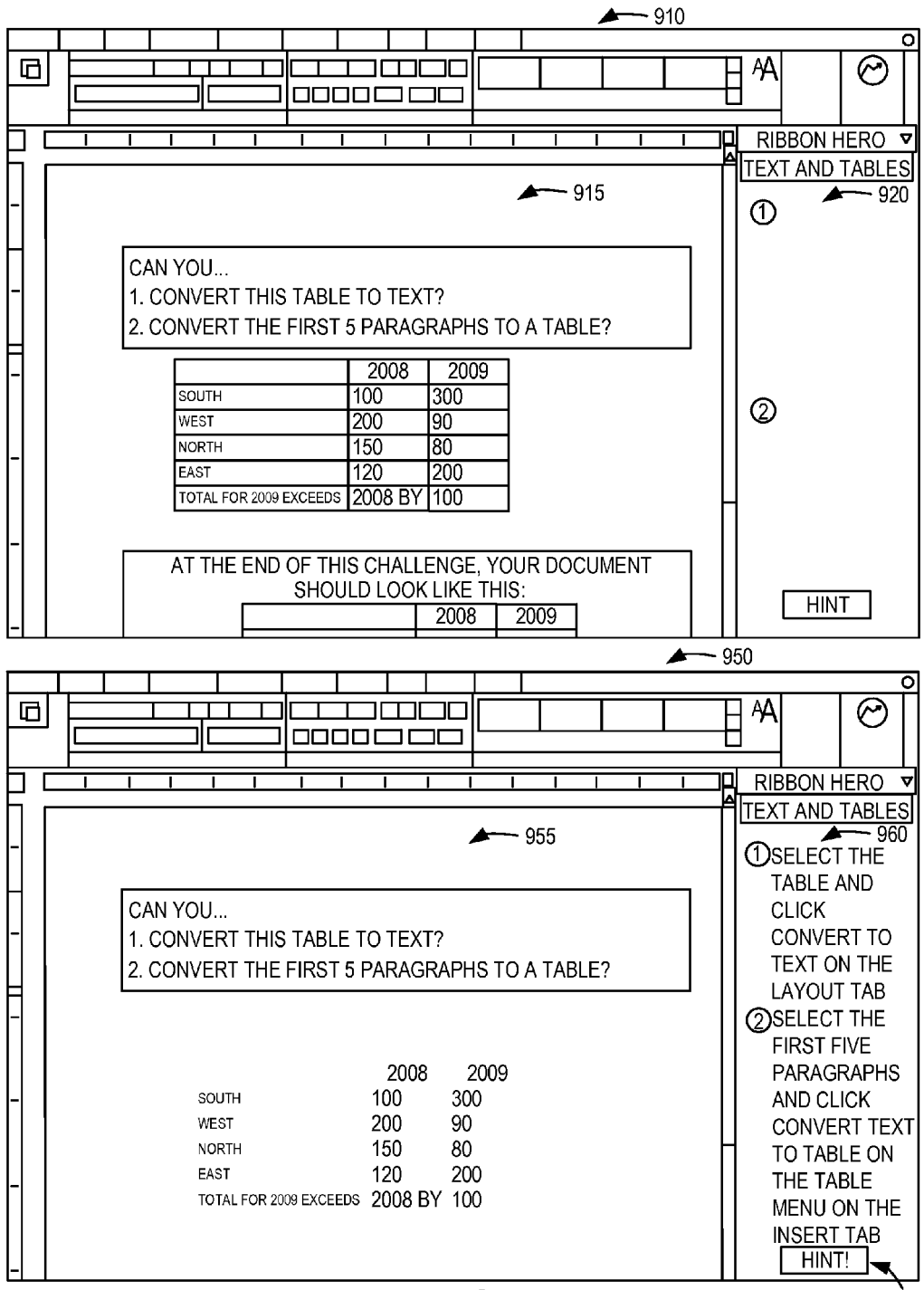
FIG. 9 illustrates displays while a user is working on a challenge.

FIG. 9 illustrates displays 910 and 950 while a user is working on a challenge. In the current example, a user is challenged to convert a table to text. A help area 920 and 960 is displayed next to the document 955 in which the challenge is performed (915 and 920) that provides the user with hints when needed. For example, selecting the hint button 965, displays a step within the help area 960 that should be completed. The first step in help area 960 shows to select the table and then click Covert to Text on the layout tab. According to one embodiment, selecting a hint lowers the total points that are achieved during the challenge. A user may be presented with an option at the completion of a challenge in which they use a hint to retry the challenge without using a hint. A hint can be asked for at any point during the challenge. When the challenges are performed quickly then the user may be awarded more points and/or provided a different sound effect upon completion of the text.

As discussed previously, sound effects can be provided during the task. For example, when a user moves over a correct menu location, a sound may be played to the user such that they are provided with feedback that they are over the correct location. Different sounds may be played when the user completes the task without any hints as compared to completing the task with other hints.

Figure 10:
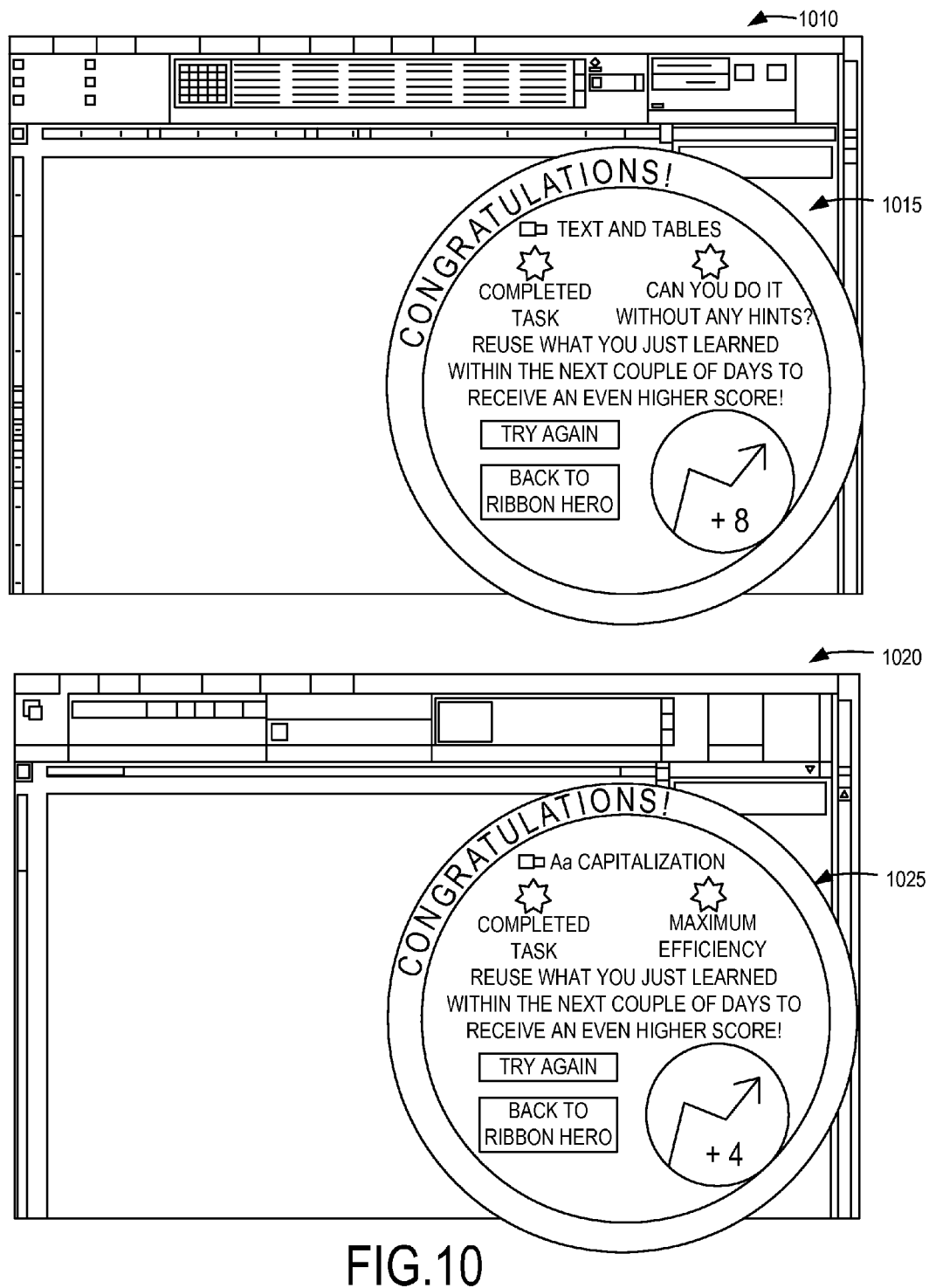
FIG. 10 shows exemplary displays presented to a user upon a successful completion of a challenge.

FIG. 10 shows exemplary displays presented to a user upon a successful completion of a challenge. Display 1010 relates to completing the challenge presented in FIG. 9. Congratulations display 1015 shows that the user completed the Text and Tables challenge and was awarded 8 points. Display 1015 also shows that at least one hint was used during the challenge and presents an option to the user as to whether to try the challenge again to see if it can be completed without any hints. Selecting the try again button returns the user to the challenge. According to one embodiment, more points may be awarded if the challenge is completed without the use of hints.

Display 1020 provides another congratulations display 11025 that shows the Aa Capitalization task was completed and that the task was completed with maximum efficiency (i.e., the minimum number of steps was used to complete the challenge). According to one embodiment, more points are awarded to the user when they use what they have learned within the challenge while working with documents.

Figure 11:
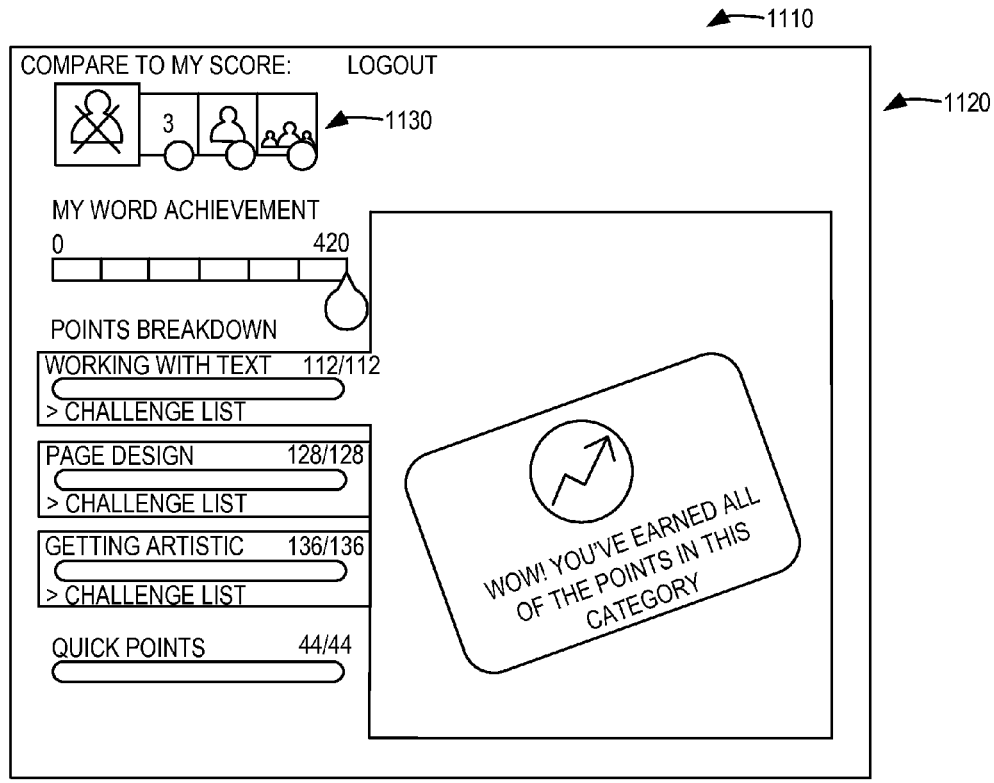
FIG. 11 shows exemplary displays illustrating a user earning points in a challenge.
Figure 11:
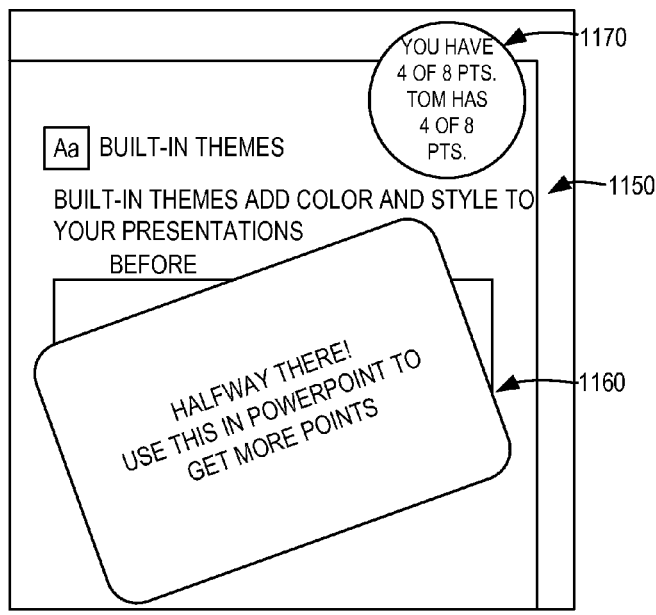

FIG. 11 shows exemplary displays illustrating a user earning points in a challenge. Display 1110 provides congratulations display 1120 showing that the user has achieved all of the available points. Display 1150 provides congratulations display 1160 showing that the user has achieved half of all of the available points. Different displays may be provided according to different embodiments. For example, a congratulatory display may be provided each time a user completes all of the challenges for an area of the application, completes a certain percentage of the challenges, and the like.

Display 1110 also shows interface 1130 that provides a list of selected users that the user would like to be compared against. According to one embodiment, when the user logs onto a system, such as through a social networking site, list 1130 is provides. As can be seen, list 1130 shows three users along with their current scores for the currently selected productivity application. Display 1170 shows the user comparing their score for the Built in Themes challenge to user Tom.

Figure 12:
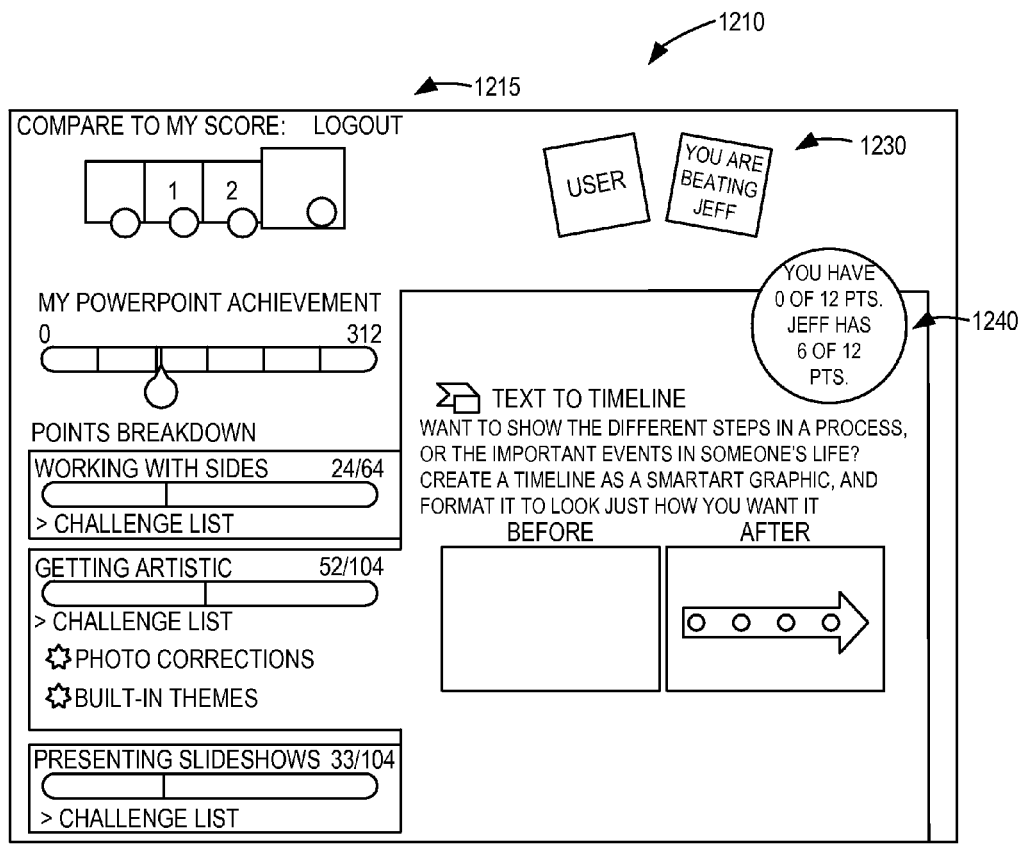
FIG. 12 shows an exemplary display comparing a user's scores to other users scores.
Figure 12:
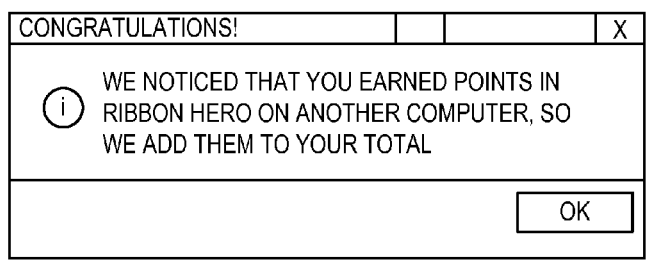

FIG. 12 shows an exemplary display comparing a user's scores to other users scores. Display 1210 shows a direct comparison between two users. According to one embodiment, a user selects a person to compare their scores to from selection interface 1215. Selection interface 1215 allows a user to select a person with whom they would like to be directly compared against. According to one embodiment, the people presented within interface 1215 relate to a person's selected network of friends. In addition to showing a user's individually selected friends, interface 1215 may also show preselected users for comparison. For example, a person that is displayed in list 1215 may represent: the average user of the challenge system; an average user having the same position/title of the user; an average user within the same organization; an average user within a same department of the user; and the like. Generally, the user may compare themselves against any user and/or representation of a group of users.

As illustrated, the user has selected user Jeff to be compared against. Comparison display 1230 shows that the user is currently beating Jeff Referring to indicators 1221-1225 it can be seen that both the current user's scores are displayed within the slider bar as well as displaying the user's score that has been selected for comparison. For example, in the Getting Artistic section 1223, the user has 52 points and the selected user for comparison (Jeff) has 40 points. Display 1240 shows that for a currently selected challenge ("Text to Timeline Challenge") the user has 0 points and Jeff has 6 of 12 available points. The user may choose another person to be compared with at any time. In addition a user may select a user to challenge. A user may select one of the users from interface 1215 and have a message sent to that selected user issuing a challenge. For example, a user may right click on a person within display 1215 and select a context menu to issue the challenge.

Challenges may also be shown that are presented in an application and/or a version of the application that is not currently being used by the user. For example, if a user is running the challenges using a first version of the productivity application and more features are provided in another version of the application, then the user may desire to obtain the new version. In the current example, in the challenges list shown in the Getting Artistic section 1223 two options not available in the user's version of the application are shown (Photo Corrections and Artistic Effects). A user may be supplied with more information upon selection and/or automatically by the application (See FIG. 13 and related discussion).

According to one embodiment, users are also distinguished based on the version of the application they are using. In the current example, referring to comparison display 1230 it can be seen that Jeff is using a newer version of the application as compared to the user.

Notice 1250 is displayed when it has been determined that the points on the current user's computer do not match the total number of points earned by the user. As discussed, a user may accumulate points on one or more different computers. When the previous scores for the user are accessed and a discrepancy has been determined, notice 1250 may be provided to the user to obtain confirmation that they would like the current scores updated.

Figure 13:
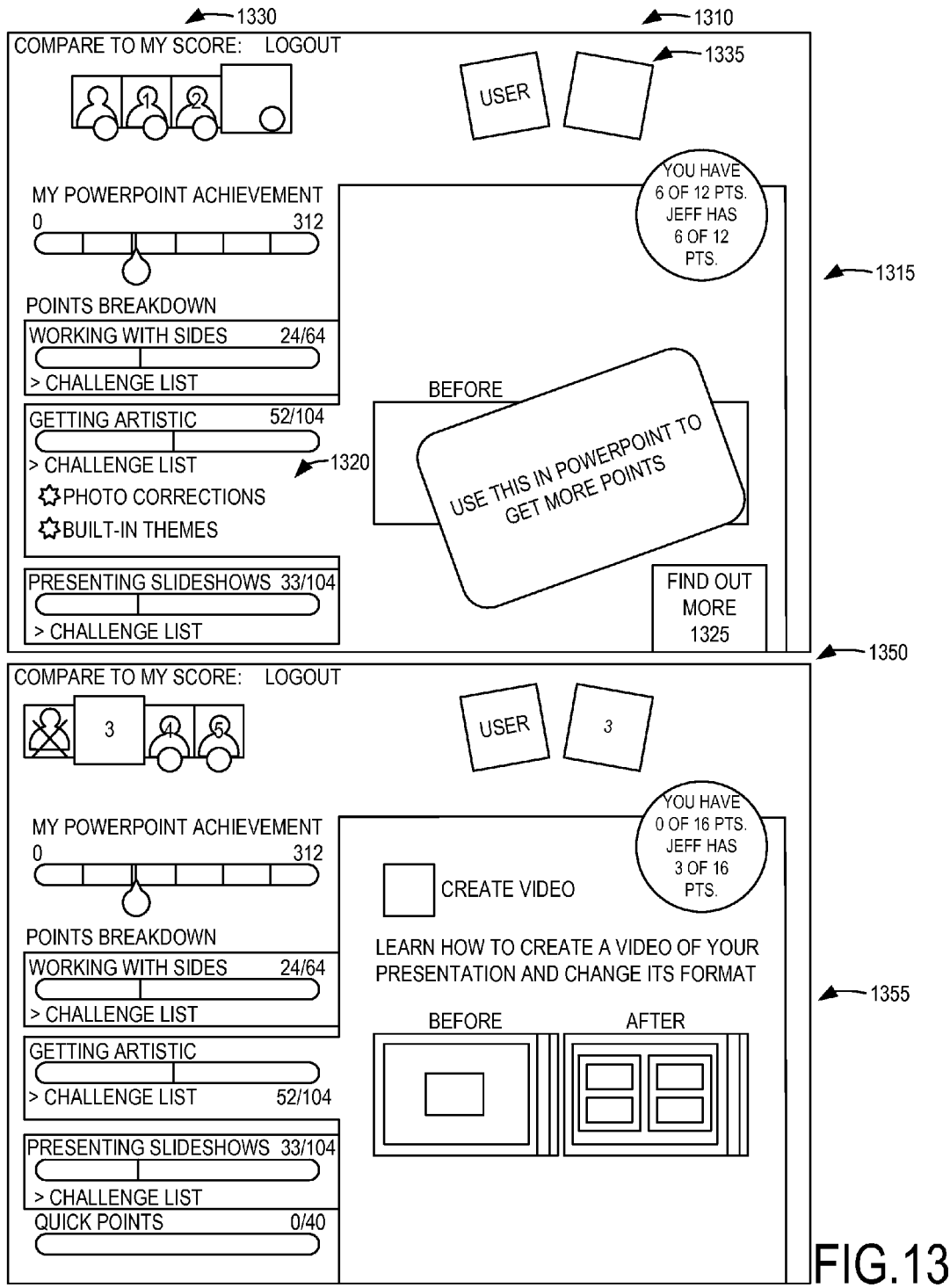
FIG. 13 shows presenting new features of an application within a different version of the application.

FIG. 13 shows presenting new features of an application within a different version of the application.

As illustrated, FIG. 13 includes display 1310 and display 1350. Display 1310 shows the user features that are available in a newer version of the application that they are using. In the current example, section 1320 shows that two features are available in a newer version of the POWERPOINT Application from MICROSOFT CORPORATION. The two new features illustrated are "Photo Corrections" and "Artistic Effects." Any number of new features may be presented in one or more of the challenge lists relating to the application. As shown, the two new features are distinguished from the available features of the application by presenting a different version number next to the challenge (i.e. 2010). When a user selects a new feature, display 1315 shows the user a preview of the new feature. A user may be presented within an option (e.g. option 1325) to upgrade to the newer version of the application and/or to try out the new feature. For example, the new feature could be used within an online version of the application and/or the new feature could be downloaded to the current computing system. In the current example, the user is limited in the points they may obtain since they can not perform the challenge in the newer version of the application. When the user upgrades to the newer version of the application, the newer version indicator (in this case 2010) is removed from the challenge. In addition to showing the user features of an application that are available in a newer version of the application, the users presented within interface 1330 or challenge display 1335 may show a version of the application they are currently using. For example, any user that is using a newer version of the application may include an indicator showing the newer version they are using. Similarly, in the current example, Jeff is shown to be using the 2010 version of the POWERPOINT application in display 1335.

Figure 14:
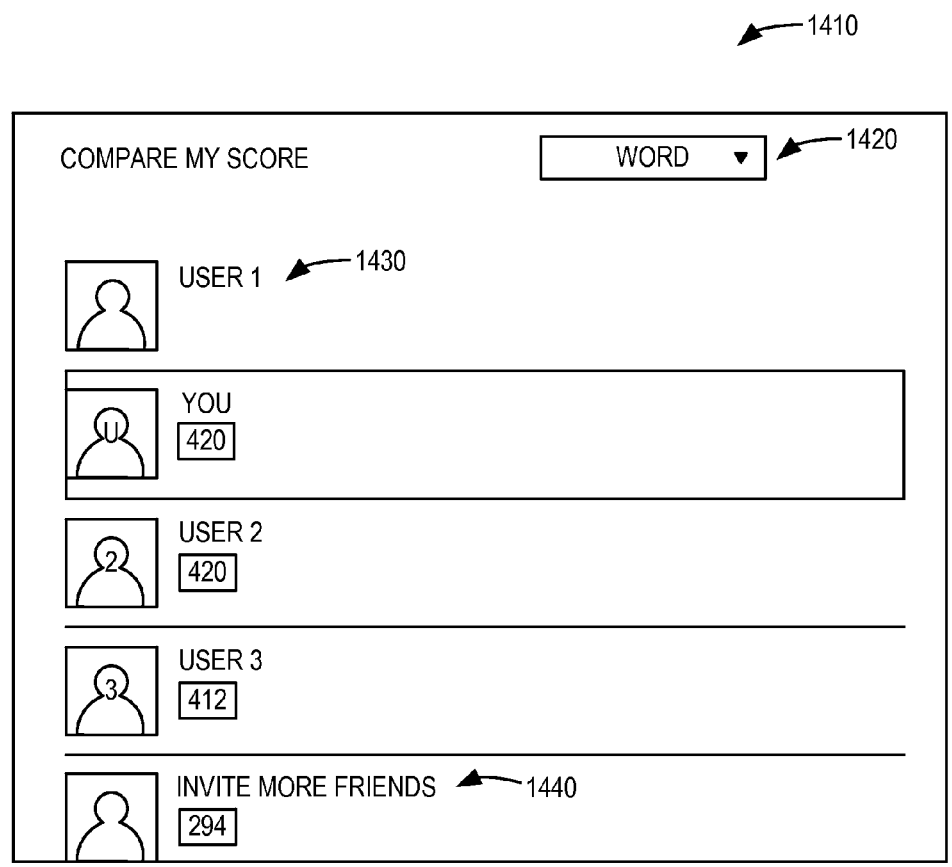
FIG. 14 shows a user comparing their score to other users.

FIG. 14 shows a user comparing their score to other users. Display 1410 shows a user interface for comparing a user's score to other users. Selection menu 1420 allows a user to select what program the user would like to compare against other users that are displayed in section 1430. The program may be any program in which the challenges and game play elements are associated with. For example, the programs may be a word processing program, a presentation program, a spreadsheet program, a database program, a productivity application, and the like. In addition to comparing the user's score to other users in a single program, the comparison may be to a combination of all or a portion of the programs. A user may also select other users to participate in the challenges by selecting link 1440. The scores may be compared to any selected list of users.

Figure 15:
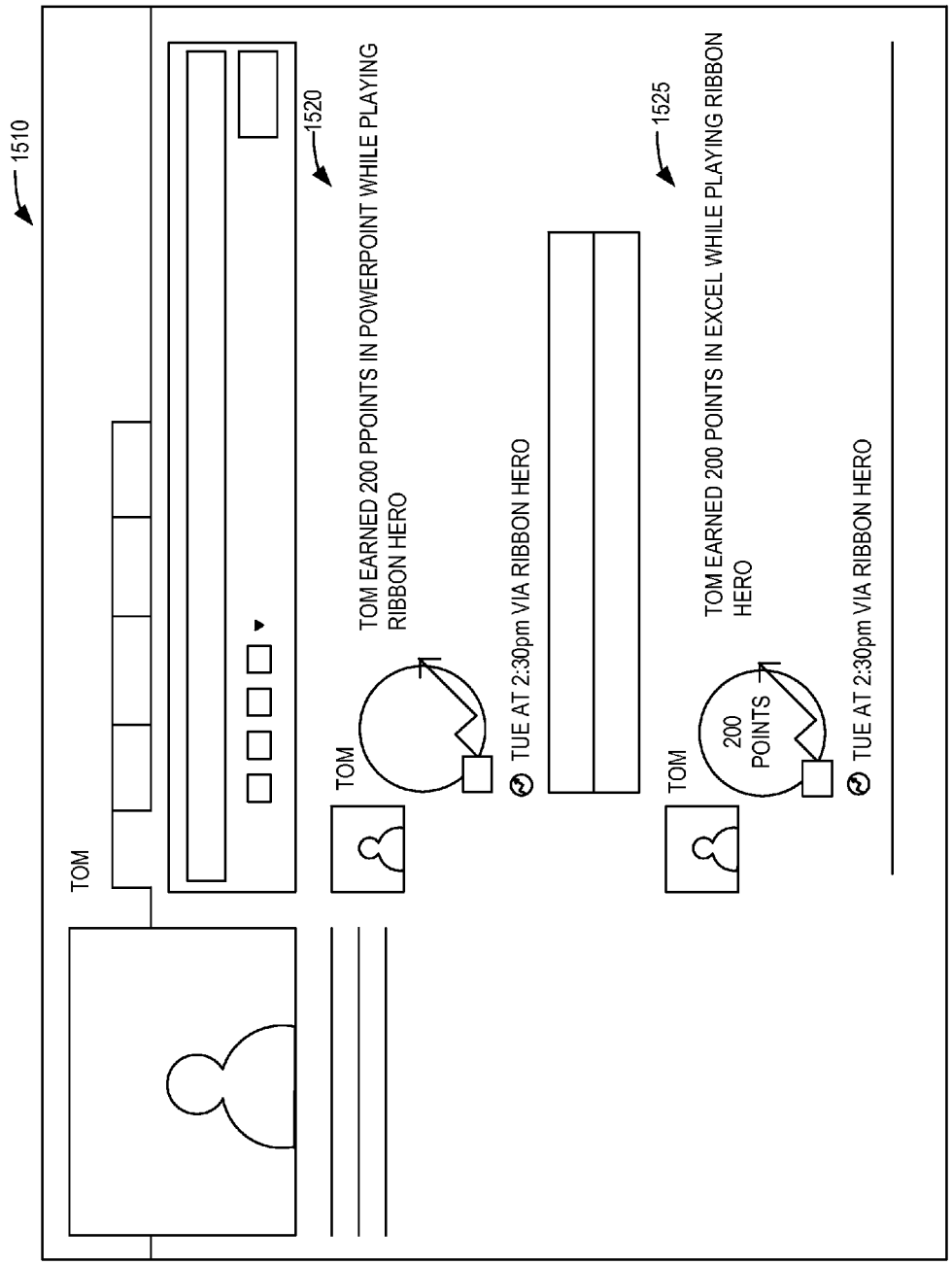
FIG. 15 shows an exemplary display of a user's page on a social networking site who is participating in challenges for one or more productivity applications.

FIG. 15 shows an exemplary display of a user's page on a social networking site who is participating in challenges for one or more productivity applications.

Display 1510 shows a page for user Tom that includes posted messages 1520 and 1525 relating to accomplishments for performing the challenges. The postings to the user's page may occur automatically and/or manually. According to one embodiment, the user selects options to configure how often they would like messages posted to one or more social networking sites. For example, a user may select that for every one hundred points earned, a message is uploaded. Messages may also be created and posted for other accomplishments such as a perfect score, completion of challenges, and the like. A user may also use the social networking site to directly challenge another user and/or group of users to a specific challenge.

The above specification, examples and data provide a complete description of the manufacture and use of the composition of the invention. Since many embodiments of the invention can be made without departing from the spirit and scope of the invention, the invention resides in the claims hereinafter appended.

What is claimed is:
1. A method for utilizing game elements within a productivity application, the method executing on a processor of a computer, comprising:
   tracking features utilized by a user within the productivity application, the productivity application being a word-processing application, a presentation application, a spreadsheet application, a database application, or a programming application;
   for each of the tracked features, determining a component score for the user based on a difficulty level of the tracked feature;
   accumulating component scores to derive a user score;
   determining challenges to provide to the user based at least in part on the tracked features utilized by the user; wherein the challenges include additional features of the application for the user to learn, the additional features being used by a group of additional users of the productivity application but not used by the user;
   displaying a user interface including categories of features within the productivity application, a user's progress towards accomplishing the challenges associated with features in each of the categories, and the challenges associated with additional features of the productivity application;
   receiving a selection of one of the challenges from the user;
   providing the selected challenge to the user;

providing a hint button during the selected challenge that directly links help content that provides one or more steps to complete the selected challenge, wherein the help content is provided to the user upon selection of a hint button during the selected challenge;

repeating the tracking, determining, and accumulating operations with respect to the additional features related to the selected challenge; and comparing the accumulated user score to a score of at least one user from the group of additional users and providing a display of the comparison to the user.

2. The method of claim 1, wherein determining the challenges comprises determining a new feature that is not included in a version of the productivity application and including the new feature in the challenges to the user.

3. The method of claim 2, further comprising providing information relating to the new feature to the user upon selection of the challenge relating to the new feature.

4. The method of claim 2, further comprising displaying the challenge that includes the new feature differently from the other challenges such that the challenge that includes the new feature is distinguishable from the other challenges.

5. The method of claim 2, further comprising accessing a social networking site and obtaining a list of users from the social networking site that are associated with the user to present to the user within a display of the selected challenge.

6. The method of claim 5, further comprising posting a message to the social networking site in response to a change in the accumulated user score of the user.

7. The method of claim 5, wherein comparing the accumulated user score to the at least one other user and providing the display of the comparison to the user comprises comparing the accumulated user score to the list of users of the social networking site.

8. The method of claim 1, wherein comparing the accumulated user score to the score of the at least one other user comprises displaying the score of the at least one other user in relation to the accumulated user score.

9. A computer storage medium having computer-executable instructions for utilizing game elements within a productivity application, the instructions executing on a processor of a computer, comprising:

tracking features utilized by a user within the productivity application, the productivity application being a word-processing application, a presentation application, a spreadsheet application, a database application, or a programming application;

for each of the tracked features, determining a component score for the user based on a difficulty level of the tracked feature;

accumulating component scores to derive a user score;

determining challenges to provide to the user based at least in part on the tracked features utilized by the user; wherein the challenges include additional features of the application for the user to learn, the additional features being used by a group of additional users of the productivity application but not used by the user;

providing a user interface including categories of features within the productivity application, a user's progress towards accomplishing the challenges associated with features in each of the categories, and the challenges associated with additional features of the productivity application;

receiving a selection of one of the challenges;

directly linking help content that is natively supplied by the application to the selected challenge, such that the linked help content is provided to the user upon selection of a hint button during the selected challenge;

repeating the tracking, determining, and accumulating operations with respect to the additional features related to the selected challenge; and comparing the user score to scores of the additional users that are obtained from a social networking site.

10. The computer storage medium of claim 9, further comprising providing a direct comparison between the score of the user and a selected user obtained from the social networking site.

11. The computer storage medium of claim 10, wherein displaying the accumulated user score comprises displaying a component score for each of a plurality of components that determine the score and displaying an indicator that shows how the score for each component compares to a score of the selected user for the component.

12. The computer storage medium of claim 10, wherein the challenges include challenges that relate to new features that are not available in a version of the application.

13. The computer storage medium of claim 12, further comprising providing an option that allows the user to receive more information about a new feature.

14. The computer storage medium of claim 10, wherein providing the challenges to the user is based on features being used by a group of users using the application that is selected by the user.

15. The computer storage medium of claim 10, wherein the other users obtained from the social networking site are displayed with each challenge.

16. The computer storage medium of claim 15, wherein a version of the application is displayed with each display of the other users.

17. A system for utilizing game elements within a productivity application, comprising:

a processor and a computer-readable medium;

an operating environment stored on the computer-readable medium and executing on the processor;

a network connection;

a productivity application and a feature manager operating on the processor, the productivity application being a word-processing application, a presentation application, a spreadsheet application, a database application, or a programming application; and configured to perform tasks, comprising:

tracking features utilized by a user within the productivity application;

for each of the tracked features, determining a component score for the user based on a difficulty level of the tracked feature;

accumulating component scores to derive a user score;

determining challenges to provide to the user based on the tracked features utilized by the user; wherein the challenges include new features of the application to learn and features unavailable within a version of the productivity application being used by the user, the new features being used by a group of additional users of the productivity application but not used by the user;

directly linking help content that is natively supplied by the application to each of the challenges, such that the linked help content for one of the recommended challenges is provided to a user without performing a search for the linked help content;

providing a user interface including categories of features within the productivity application, a user's progress towards accomplishing the challenges associated with features in each of the categories, and the challenges associated with additional features of the productivity application;

displaying the user score for the user and scores of the group of additional users, along with a display showing a component score for each of a plurality of components that determine the user score and displaying an indicator that shows how the score for each component compares to a score of the another user for the component;

receiving a selection of one of the challenges; and
providing a training challenge to allow a user to practice the recommended challenge that is selected.

18. The system of claim 17, wherein providing the training challenge is provided to the another user to create a head-to-head competition between at least two users.

19. The system of claim 17, wherein providing the challenges to the user is based on features being used by a group of users in a social networking site.

20. The system of claim 19, further comprising updating the score when the accumulated user score does not reflect a user's total score upon logging into the social networking site.

* * * * *